United States Patent
Dohi et al.

[19]

[11] Patent Number: 6,034,952
[45] Date of Patent: Mar. 7, 2000

[54] METHOD AND INSTRUMENT FOR MEASURING RECEIVING SIR AND TRANSMISSION POWER CONTROLLER

[75] Inventors: Tomohiro Dohi; Syunsuke Seo; Yukihiko Okumura; Mamoru Sawahashi; Fumiyuki Adachi, all of Yokohama, Japan

[73] Assignee: NTT Mobile Communications Networks, Inc., Tokyo, Japan

[21] Appl. No.: 08/983,412

[22] PCT Filed: Apr. 14, 1997

[86] PCT No.: PCT/JP97/01289

§ 371 Date: Dec. 12, 1997

§ 102(e) Date: Dec. 12, 1997

[87] PCT Pub. No.: WO97/39545

PCT Pub. Date: Oct. 23, 1997

[30] Foreign Application Priority Data

Apr. 12, 1996 [JP] Japan ................................. 8-091579
Jun. 24, 1996 [JP] Japan ................................. 8-162972

[51] Int. Cl.[7] .................................................. H04J 13/00
[52] U.S. Cl. ........................ 370/335; 370/252; 455/67.3; 455/522; 455/69
[58] Field of Search ..................... 370/252, 328, 370/329, 331, 332, 335, 336, 342, 345, 441, 479; 375/316, 340, 341, 346; 455/67.1, 67.3, 67.6, 226.1, 226.2, 226.3, 522

[56] References Cited

U.S. PATENT DOCUMENTS

| | | | |
|---|---|---|---|
| 5,333,175 | 7/1994 | Ariyavisitakul et al. | 455/69 |
| 5,455,967 | 10/1995 | Amezawa et al. | 455/69 |
| 5,504,730 | 4/1996 | Tiedemann, Jr. | 370/252 |
| 5,590,409 | 12/1996 | Sawahashi et al. | |
| 5,604,766 | 2/1997 | Dohi et al. | |
| 5,623,486 | 4/1997 | Dohi et al. | 370/342 |
| 5,675,581 | 10/1997 | Soliman | 370/252 |
| 5,694,388 | 12/1997 | Sawahashi et al. | 370/206 |

FOREIGN PATENT DOCUMENTS

| | | |
|---|---|---|
| 7-273722 | 10/1995 | Japan . |
| 8-032513 | 2/1996 | Japan . |
| 8-032514 | 2/1996 | Japan . |

*Primary Examiner*—Ricky Ngo
*Attorney, Agent, or Firm*—Brown Raysman Millstein Felder & Steiner LLP

[57] ABSTRACT

An SIR measuring apparatus with a simple configuration capable of improving the accuracy of received SIR measurement in CDMA mobile radio equipment using pilot symbols. A received signal (20) is input to a synchronization detector (21) that regenerates the clock timing of symbols and frame timing equivalent to the repetition period of the pilot signal. An interpolating coherent detector (22) produces information symbols (23) obtained from the received signal (20) through absolute phase coherent detection. A decision signal power calculator (24) obtains desired wave power values. A quasi-interference power calculator (25) obtains differences between the power values of the information symbols and a fading envelope, and adopts the differences as the quasi-interference power. Integrators (26 and 27) integrate received desired wave power and quasi-interference wave power. An SIR measuring portion (28) divides an averaged received desired wave power integral by an averaged quasi-interference power integral to obtain the received SIR (29).

24 Claims, 21 Drawing Sheets

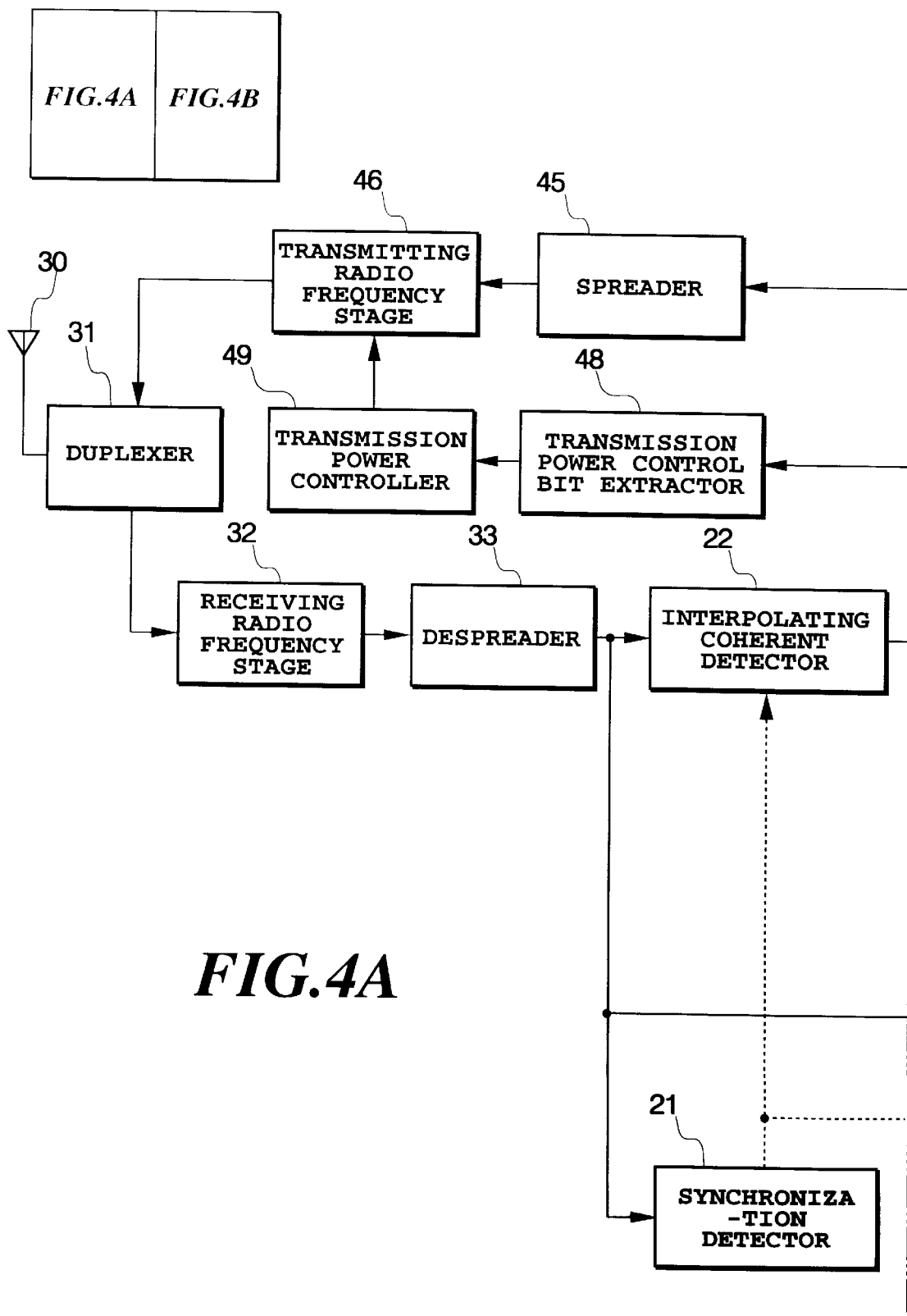

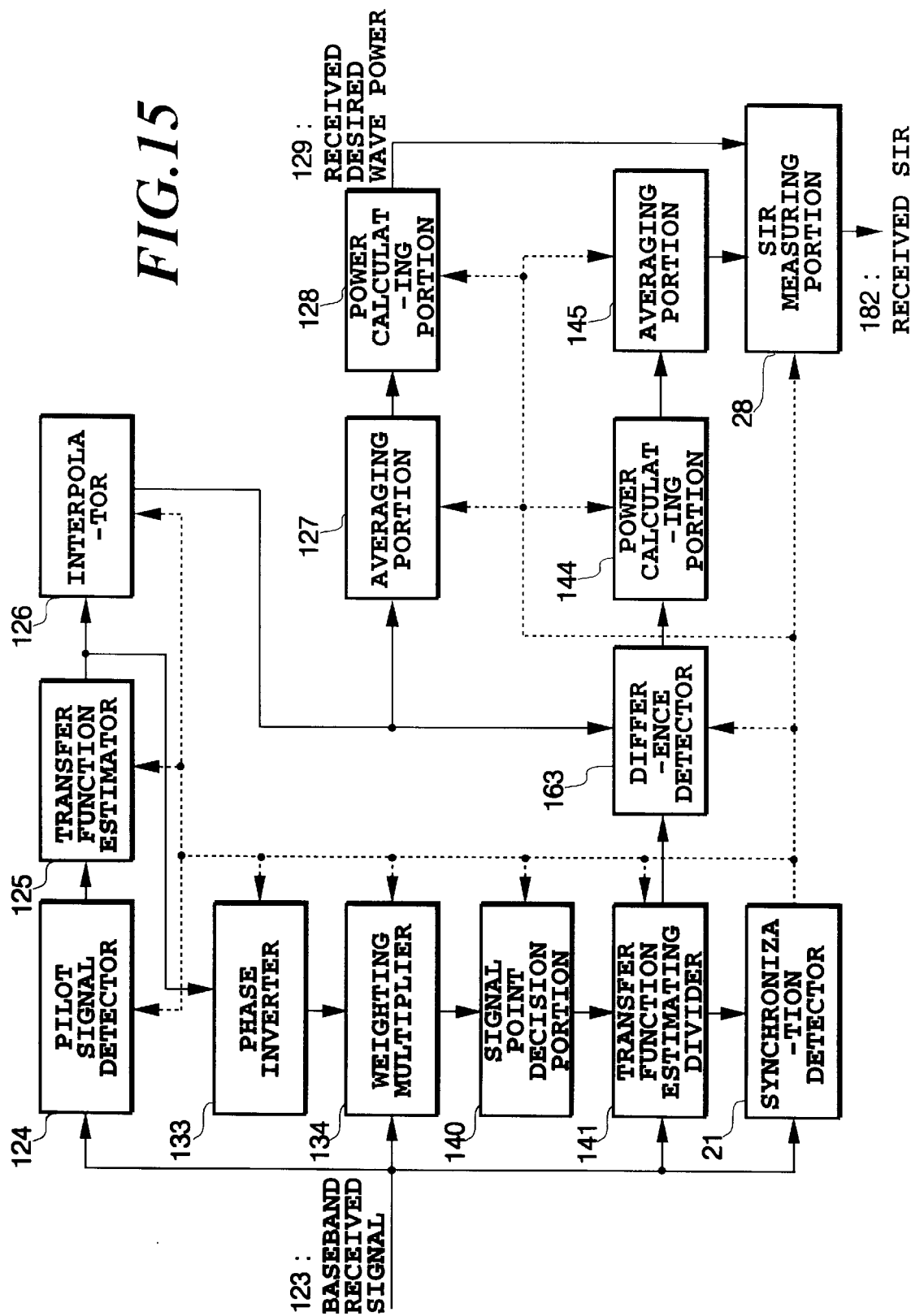

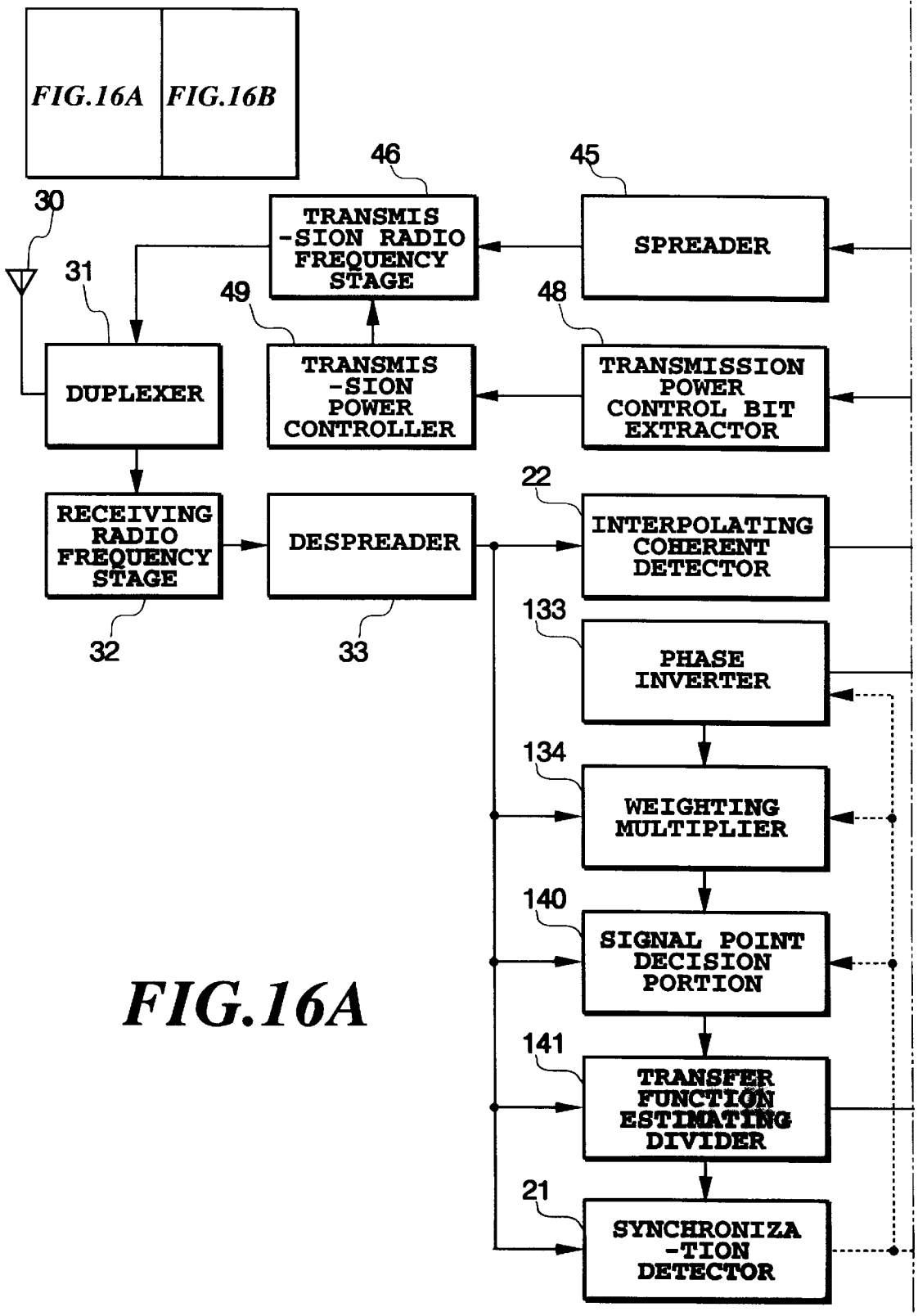

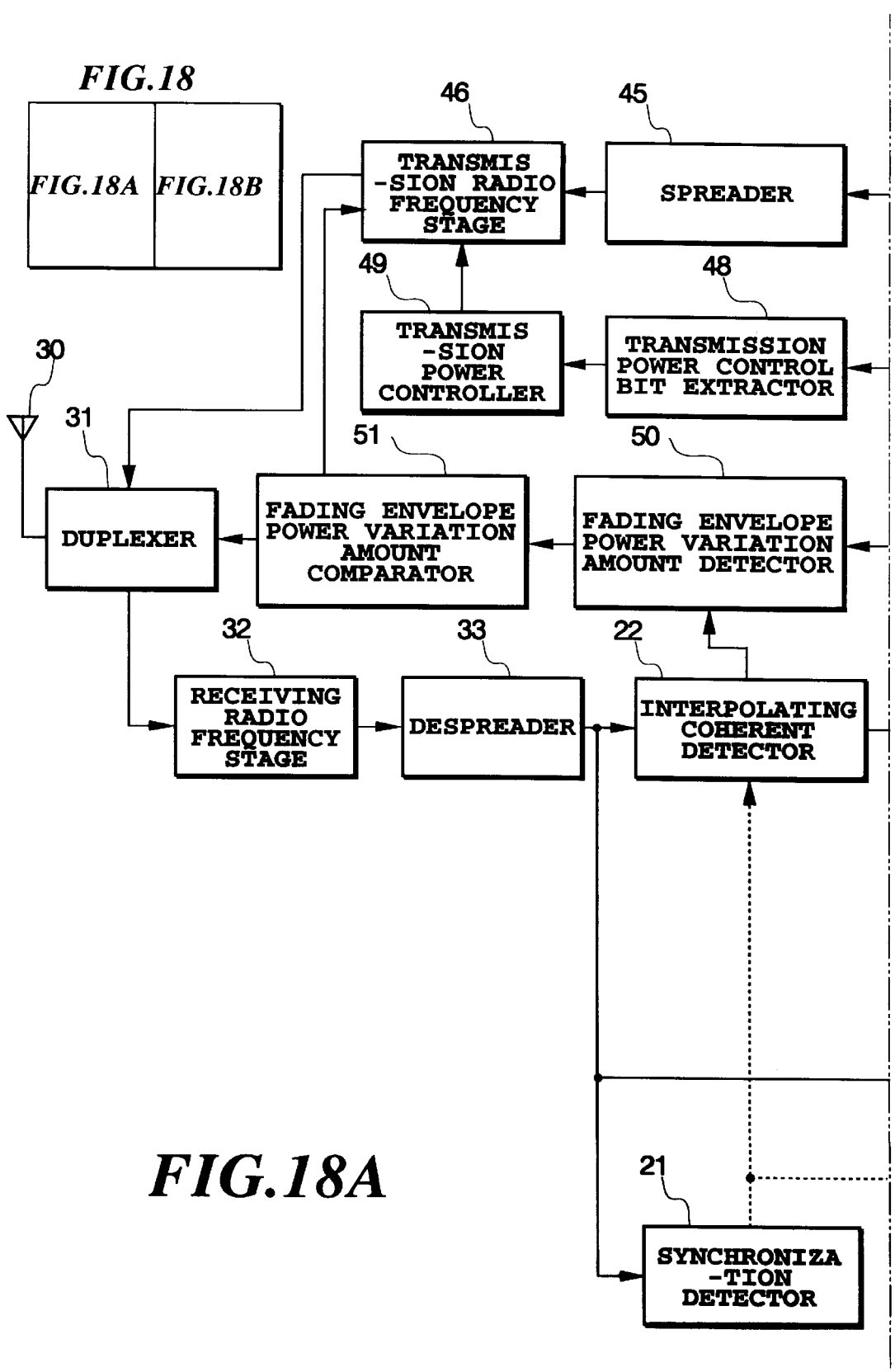

METHOD AND INSTRUMENT FOR MEASURING RECEIVING SIR AND TRANSMISSION POWER CONTROLLER

The contents of Application Nos. 8-091,579, filed Apr. 12, 1996 and 8-162,972, filed Jun. 24, 1996, in Japan is hereby incorporated by reference.

TECHNICAL FIELD

The present invention relates to a received SIR measuring method and apparatus, and a power transmission control system applied to a CDMA (Code Division Multiple Access) system employed in mobile communications.

BACKGROUND ART

In the CDMA system, since the same frequency band is shared by multiple users, signals of other users become interference signals which degrade the communication quality of a particular user. When a base station communicates with near and remote mobile stations at the same time, it receives the transmitted signal from the near mobile station at a high level, whereas from the remote one at a much lower level. Thus, the communications between the base station and the remote mobile station presents a problem in that the channel quality is sharply degraded by interference from the near mobile station, which is generally called a near-far problem.

As one of the techniques used for solving the near-far problem, transmission power control has been studied which controls the transmission power such that the received power of a receiving station, or the SIR (Signal-to-Interference plus noise power Ratio) thereof is kept fixed regardless of the location of a mobile station. This will provide consistent channel quality across a service area. In particular, for reverse link channels, the transmission power control of the mobile stations are carried out so that the received power or SIR is kept constant of the signals transmitted from the mobile stations and received at the receiving terminal of the base station.

Since the CDMA scheme considers the interference from other users as white noise, an increasing number of users is equivalent to an increase of noise power. Thus, the capacity in terms of the number of simultaneous users in the same cell depends on the received SIR for achieving required channel quality. In contrast, concerning the forward link channels, since incoming signals from the intended user and other users causing the interference arrive through the same propagation path, their long term fluctuations, short term fluctuations and instantaneous fluctuations are the same, and hence the received SIR except for the noise power is always constant. This means that no transmission power control is necessary as long as the interference within the same cell is handled. However, since the CDMA scheme with its interference equivalent to white noise reuses the same frequency band in contiguous cells, the interference therefrom must be taken into account. Although the interference power from other cells has instantaneous fluctuations due to Rayleigh fading like the interference within the cell, the fluctuations differ from those of the desired signal.

The CDMA system standardized by TIA in the United States does not basically perform the forward link transmission power control. Instead, a method is employed in which a mobile station detects a frame error rate, and requires the base station to increase the transmission power to the mobile station when the error rate exceeds a predetermined threshold value. This is because a sharp increase of the transmission power would increase the interference to other cells. However, since the signals transmitted from other cell base stations become instantaneously fluctuating interference signals, the conventional technique described above cannot follow them.

As a transmission power control method to follow the instantaneous fluctuations, a closed loop transmission power control system is known which employs transmission power control bits. In this control system, when a mobile station within a cell communicates with the base station in that cell, it measures the received SIR of the desired wave from the base station, and determines the transmission power control bits for controlling the transmission power of the base station in accordance with the measurement results. Subsequently, the mobiles station inserts the transmission power control bits into its transmitted signal and transmits them to the base station. Receiving the signal transmitted from the mobile station, the base station extracts the transmission power control bits therefrom, and determines the transmission power in accordance with the command of the transmission power control bits. In addition, the base station measures the received SIR of the wave from the mobile station, and determines the transmission power control bits for controlling the transmission power of the mobile station on the basis of the measurement results. Then, the base station inserts the transmission power control bits into the transmitted signal, and transmits them to the mobile station. Receiving the signal transmitted from the base station, the mobile station extracts the transmission power control bits, and determines the transmission power in accordance with the instructions of the transmission power control bits. The closed loop thus formed between the mobile station and the base station enables the mobile station to control its transmission power. The close loop transmission power control using the transmission power control bits requires a highly accurate SIR measurement technique.

Conventional SIR measurement techniques, however, have a problem in that the measurement accuracy of the received desired wave power can be degraded at the places where the envelope of the received signal falls owing to fading. This is because they perform the measurements using the received data symbols decided by the interpolation of pilot signals, and this can cause large differences between actual and interpolated values of the received data symbols at these places.

In addition, using the entire interval between intermittent pilot signals as the integration interval of the fading envelope power can cause the degradation in the measurement accuracy of the received interference power because of the decision error of signal points of the received signal.

Therefore, an object of the present invention is to provide a received SIR measuring method and apparatus which can improve the accuracy of the received SIR measurement.

Another object of the present invention is to achieve the transmission power control by applying the measuring apparatus.

DISCLOSURE OF THE INVENTION

In a first aspect of the present invention, there is provided a received SIR (signal-to-interference plus noise power ratio) measuring method of a communications system using a signal including a known pilot signal inserted into an information signal at predetermined intervals, the method comprising:

the step of measuring received wave power in which average value is adopted as the received wave power wherein the step of measuring received wave power comprising steps of:

carrying out interpolating coherent detection of information data symbols from received data symbols by using the pilot signal;

computing power values of the information data symbols decided by interpolation integrating the power values of the information data symbols in the predetermined interval of the pilot signal to compute the average value of the power values;

the step of measuring received interference wave power in which a ratio is computed of an integral of the information data symbols to an integral of the power differences wherein the step of measuring received interference wave power comprising steps of;

computing differences between power values of the decided information data symbols and power values of a fading envelope at same sampling times;

obtaining an integral of the differences of the power values in the predetermined intervals of the pilot signal; and the step of computing a ratio of the received desired wave power to the received interference wave power, wherein the step of measuring received interference wave power comprising steps of the computed ratio is adopted as the SIR.

In a second aspect of the present invention, there is provided a received SIR (signal-to-interference plus noise power ratio) measuring method of a communications system using a signal including a known pilot signal inserted into an information signal at predetermined intervals, the method comprising:

computing power values of a fading envelope obtained by interpolation;

the step of measuring received desired wave power which includes the step of averaging the power values in a section between successive pilot signals, and which adopts the obtained average value as the received desired wave power;

the step of measuring received interference wave power which obtains received interference wave power from received data symbols and the fading envelope obtained by the interpolation; and the step of computing a ratio of the received desired wave power to the received interference wave power, wherein the computed ratio is adopted as the SIR.

Here, the step of measuring the received interference wave power may comprise the steps of:

computing ratios of the received data symbols to a fading envelope obtained by interpolation;

multiplying the ratios by a square of the fading envelope, and making a decision of signal points from results of the multiplication;

computing a fading envelope including interference components using the received data symbols and the decision values;

computing differences between the computed value and the fading envelope obtained by the interpolation;

integrating squares of the differences in the section between the successive pilot signals; and averaging integrals obtained by the integration in the section between the successive pilot signals.

The step of measuring the received interference wave power may comprise the steps of:

computing ratios of the received data symbols to a fading envelope obtained by interpolation;

multiplying the ratios by a square of the fading envelope;

making a decision of signal points from results of the multiplication;

computing a fading envelope including interference components using the received data symbols and the decision results;

computing an average value of the received data symbols in a pilot signal section;

computing differences between the fading envelope and the average value;

integrating squares of the differences in the section between the successive pilot signals; and averaging integrals obtained by the integration over a plurality of sections between the successive pilot signals.

The step of measuring the received interference wave power may comprise the steps of:

computing ratios of the received data symbols to a fading envelope obtained by interpolation;

multiplying the ratios by a square of the fading envelope;

making a decision of signal points from results of the multiplication;

computing a fading envelope including interference components using the received data symbols and the decision results;

computing an average value of the received data symbols in a pilot signal section;

computing differences between the fading envelope and the average value;

integrating squares of the differences in only the pilot signal section; and averaging integrals obtained by the integration over a plurality of sections between the successive pilot signals.

The step of measuring the received interference wave power may comprise the steps of:

computing ratios of the received data symbols to a fading envelope obtained by interpolation;

multiplying the ratios by a square of the fading envelope;

averaging products of the multiplication in the section between successive pilot signals;

computing differences between an average value obtained by the averaging and the products of the multiplication;

integrating squares of the differences in the section between the successive pilot signals; and averaging integrals obtained by the integration over a plurality of sections between the successive pilot signals.

In a third aspect of the present invention, there is provided a received SIR (signal-to-interference plus noise power ratio) measuring method of a communications system using a signal including a known pilot signal inserted into an information signal at predetermined intervals, the method comprising:

the step of measuring received desired wave power including the steps of, computing ratios of received data symbols to a fading envelope obtained by interpolation, multiplying the ratios by a square of the fading envelope, averaging products of the multiplication in the section between successive pilot signals, and obtaining a square of an absolute value of an average value obtained by the averaging, wherein the square of the absolute value is adopted as the received desired wave power;

the step of measuring received interference wave power which obtains received interference wave power from the received data symbols and the fading envelope obtained by the interpolation; and the step of computing a ratio of the received desired wave power to the received interference wave power, wherein the computed ratio is adopted as the SIR.

Here, the step of measuring the received interference wave power may comprise the steps of:

making a decision of signal points from results of the multiplication;

computing a fading envelope including interference components using the received data symbols and the decision results;

computing differences between the computed value and the fading envelope obtained by the interpolation;

integrating squares of the differences in the section between the successive pilot signals; and averaging integrals obtained by the integration in a plurality of sections between the successive pilot signals.

The step of measuring the received interference wave power may comprise the steps of:

making a decision of signal points from results of the multiplication;

computing a fading envelope including interference components using the received data symbols and the decision values;

computing an average value of the received data symbols in the section between successive pilot signals;

computing differences between the fading envelope and the average value;

integrating squares of the differences in the section between the successive pilot signals; and averaging integrals obtained by the integration over a plurality of sections between the successive pilot signals.

The step of measuring the received interference wave power may comprise the steps of:

making a decision of signal points from results of the multiplication;

computing a fading envelope including interference components using the received data symbols and the decision results;

computing an average value of the received data symbols in a pilot signal section;

computing differences between the fading envelope and the average value;

integrating squares of the differences in only the pilot signal section; and averaging integrals obtained by the integration over a plurality of sections between the successive pilot signals.

The step of measuring the received interference wave power may comprise the steps of:

averaging products of the multiplication in the section between successive pilot signals;

computing differences between an average value obtained by the averaging and the products of the multiplication;

integrating squares of the differences in the section between the successive pilot signals; and averaging integrals obtained by the integration over a plurality of sections between the successive pilot signals.

In a fourth aspect of the present invention, there is provided a received SIR measuring apparatus of a communications system using a signal including a known pilot signal inserted into an information signal at predetermined intervals, the apparatus comprising:

coherent detection means for carrying out interpolating coherent detection using the pilot signal;

means for computing power values of the information data symbols decided by interpolation;

means for obtaining an integral of the power values of the information data symbols in the predetermined interval of the pilot signal;

means for computing differences between power values of the decided information data symbols and power values of a fading envelope at same sampling times;

means for obtaining an integral of the differences of the power values in the predetermined interval of the pilot signal; and means for computing a ratio of the integral of the power values of the information data symbol to the integral of the differences of the power values, wherein the computed ratio is adopted as the signal-to-interference plus noise power ratio (SIR).

In a fifth aspect of the present invention, there is provided a received SIR measuring apparatus of a communications system using a signal including a known pilot signal inserted into an information signal at predetermined intervals, the apparatus comprising:

a received desired wave power measuring circuit including, means for computing power values of a fading envelope obtained by interpolation, and means for averaging the power values in a section between successive pilot signals, wherein the obtained average value is adopted as the received desired wave power;

a received interference wave power measuring circuit for measuring received interference wave power from received data symbols and the fading envelope; and a computing circuit for computing a ratio of the received desired wave power to the received interference wave power, wherein the computed ratio is adopted as the SIR.

Here, the received interference wave power measuring circuit may comprise:

means for computing ratios of the received data symbols to a fading envelope obtained by interpolation;

means for multiplying the ratios by a square of the fading envelope; means for making a decision of signal points from results of the multiplication;

means for computing a fading envelope including interference components using the received data symbols and the decision results;

means for computing differences between the computed value and the fading envelope obtained by the interpolation;

means for integrating squares of the differences in the section between the successive pilot signals; and means for averaging integrals obtained by the integration in the section between the successive pilot signals.

The received interference wave power measuring circuit may comprise:

means for computing ratios of the received data symbols to a fading envelope obtained by interpolation;

multiplying means for multiplying the ratios by a square of the fading envelope;

means for making a decision of signal points from results of the multiplication;

means for computing a fading envelope including interference components using the received data symbols and the decision results;

means for computing an average value of the received data symbols in the section between successive pilot signals;

means for computing differences between the fading envelope and the average value;

means for integrating squares of the differences in the section between the successive pilot signals; and means for averaging integrals obtained by the integration over a plurality of sections between the successive pilot signals.

The received interference wave power measuring circuit may comprise:

means for computing on a complex signal space ratios of the received data symbols to a fading envelope obtained by interpolation;

means for multiplying the ratios by a square of the fading envelope;

means for making a decision of signal points from results of the multiplication;

means for computing a fading envelope including interference components using the received data symbols and the decision values;

means for computing an average value of the received data symbols in a pilot signal section;

means for computing differences between the fading envelope and the average value;

means for integrating squares of the differences in only the pilot signal section; and means for averaging integrals obtained by the integration over a plurality of sections between the successive pilot signals.

In a sixth aspect of the present invention, there is provided a received SIR measuring apparatus of a communications system using a signal including a known pilot signal inserted into an information signal at predetermined intervals, the apparatus comprising:

a received desired wave power measuring circuit including, means for computing ratios of received data symbols to a fading envelope obtained by interpolation, means for multiplying the ratios by a square of the fading envelope, and means for averaging products of the multiplication in the section between successive pilot signals, wherein a square of an absolute value of the average value is adopted as received desired wave power;

a received interference wave power measuring circuit for measuring received interference wave power from the received data symbols and the fading envelope; and a computing circuit for computing a ratio of the received desired wave power to the received interference wave power, wherein the computed ratio is adopted as the SIR.

Here, the received interference wave power measuring circuit may comprise:

means for averaging products of the multiplication in the section between successive pilot signals, means for computing differences between an average value obtained by the averaging and the products of the multiplication;

means for integrating squares of the differences in the section between the successive pilot signals; and means for averaging integrals obtained by the integration over a plurality of sections between the successive pilot signals.

The received interference wave power measuring circuit may comprise:

means for making a decision of signal points from results of the multiplication;

means for computing a fading envelope including interference components using the received data symbols and the decision values;

means for computing differences between the computed value and the fading envelope obtained by the interpolation;

means for integrating squares of the differences in the section between the successive pilot signals; and means for averaging integrals obtained by the integration in a plurality of sections between the successive pilot signals.

The received interference wave power measuring circuit may comprise:

means for making a decision of signal points from results of the multiplication;

means for computing a fading envelope including interference components using the received data symbols and the decision values;

means for computing an average value of the received data symbols in the section between successive pilot signals;

means for computing differences between the fading envelope and the average value;

means for integrating squares of the differences in the section between the successive pilot signals; and means for averaging integrals obtained by the integration over a plurality of sections between the successive pilot signals.

The received interference wave power measuring circuit may comprise:

means for making a decision of signal points from results of the multiplication;

means for computing a fading envelope including interference components using the received data symbols and the decision values;

means for computing an average value of the received data symbols in a pilot signal section;

means for computing differences between the fading envelope and the average value;

means for integrating squares of the differences in only the pilot signal section; and means for averaging integrals obtained by the integration over a plurality of sections between the successive pilot signals.

The received interference wave power measuring circuit may comprise:

means for averaging products of the multiplication in the section between successive pilot signals;

means for computing differences between an average value obtained by the averaging and the products of the multiplication;

means for integrating squares of the differences in the section between the successive pilot signals; and means for averaging integrals obtained by the integration over a plurality of sections between the successive pilot signals.

In a seventh aspect of the present invention, there is provided a transmission power control system comprising:

means for comparing a resultant SIR measured by the received SIR measuring apparatus as defined in any one of claims 13–23 with a target SIR;

means for transmitting a transmission power control signal to a party station in response to a compared result;

means for receiving and demodulating a transmission power control signal transmitted from the party station; and means for controlling transmission power in accordance with the demodulated transmission power control signal.

BRIEF DESCRIPTION OF THE DRAWINGS

FIG. 15 is a block diagram showing a received desired wave power measuring apparatus;

BEST MODE FOR CARRYING OUT THE INVENTION

The following embodiments in accordance with the present invention relate to the received desired wave power measurement for measuring power of a received desired wave by the straightforward use of the measured values of the amplitude of received data symbols.

Since both the transmitting and receiving stations know the pattern of the pilot signal used for the power measurement in advance, they can compute the fading envelope power including noise components without causing signal point decision errors. Accordingly, the received desired wave power measurement which will be described below carries out the power measurement of a received interference wave by integrating in the pilot signal section the difference between the average value of the transmitted data symbols and the fading envelope including the noise components, and by averaging the integrated values over a plurality of slots, thereby adopting the averages of the integrated values as the received interference power.

The embodiments in accordance with the present invention will now be described in detail with reference to the drawings.

Figure 1:
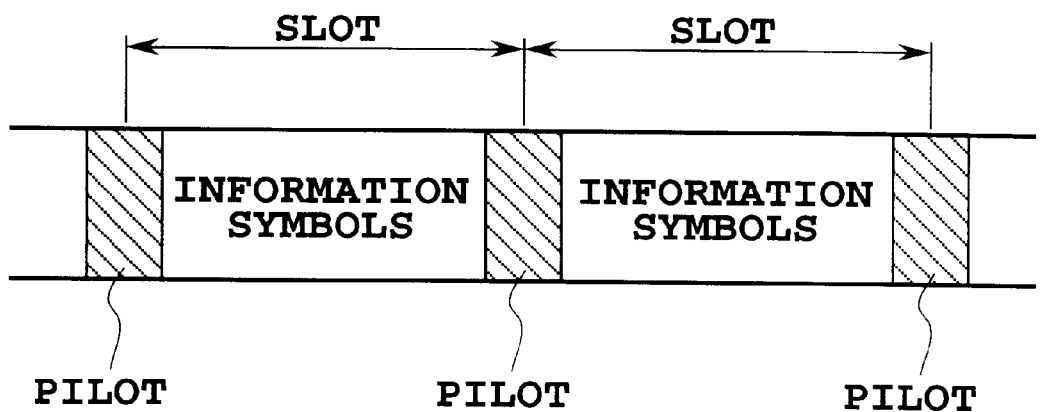
FIG. 1 is a diagram illustrating a frame structure used for the interpolating coherent detection.

FIG. 1 illustrates an example of a signal structure for implementing the coherent detection using the pilot signal. The pilot signal whose phase is known in advance to both transmitting and receiving sides is periodically inserted into a transmitted signal. One period between successive pilot signals is called a slot.

Figure 2A:
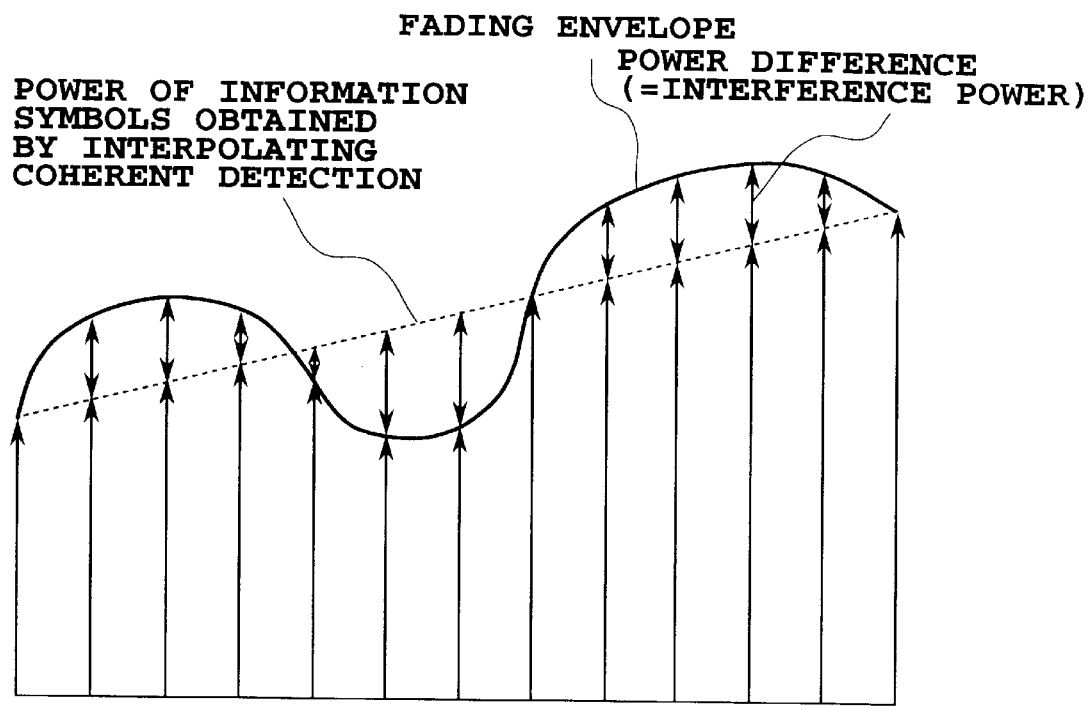
FIG. 2A is a diagram illustrating relationships between a fading envelope and the interpolating coherent detection.
Figure 2B:
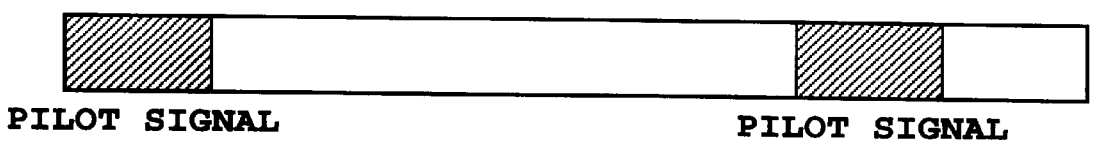
FIG. 2B is a diagram illustrating a transmitted signal into which a pilot signal is inserted.

FIG. 2A is a diagram illustrating the principle of the power measurement of the transmitted signal carried out by a receiving station in accordance with the present invention. As shown in FIG. 1, the pilot signal is periodically inserted into the transmitted signal (see, FIG. 2B also). The interpolating coherent detection using the pilot signal obtains a line across the successive pilot signals as indicated by the broken line in FIG. 2A. Actually received information symbols, however, fluctuate as denoted by the real line owing to the effect of fading. The present invention tries to achieve more accurate measurement of received signal power by obtaining the differences (interference power) between the power of the information symbols obtained by the interpolating coherent detection and the power of the information symbols undergoing the fading.

Figure 3:
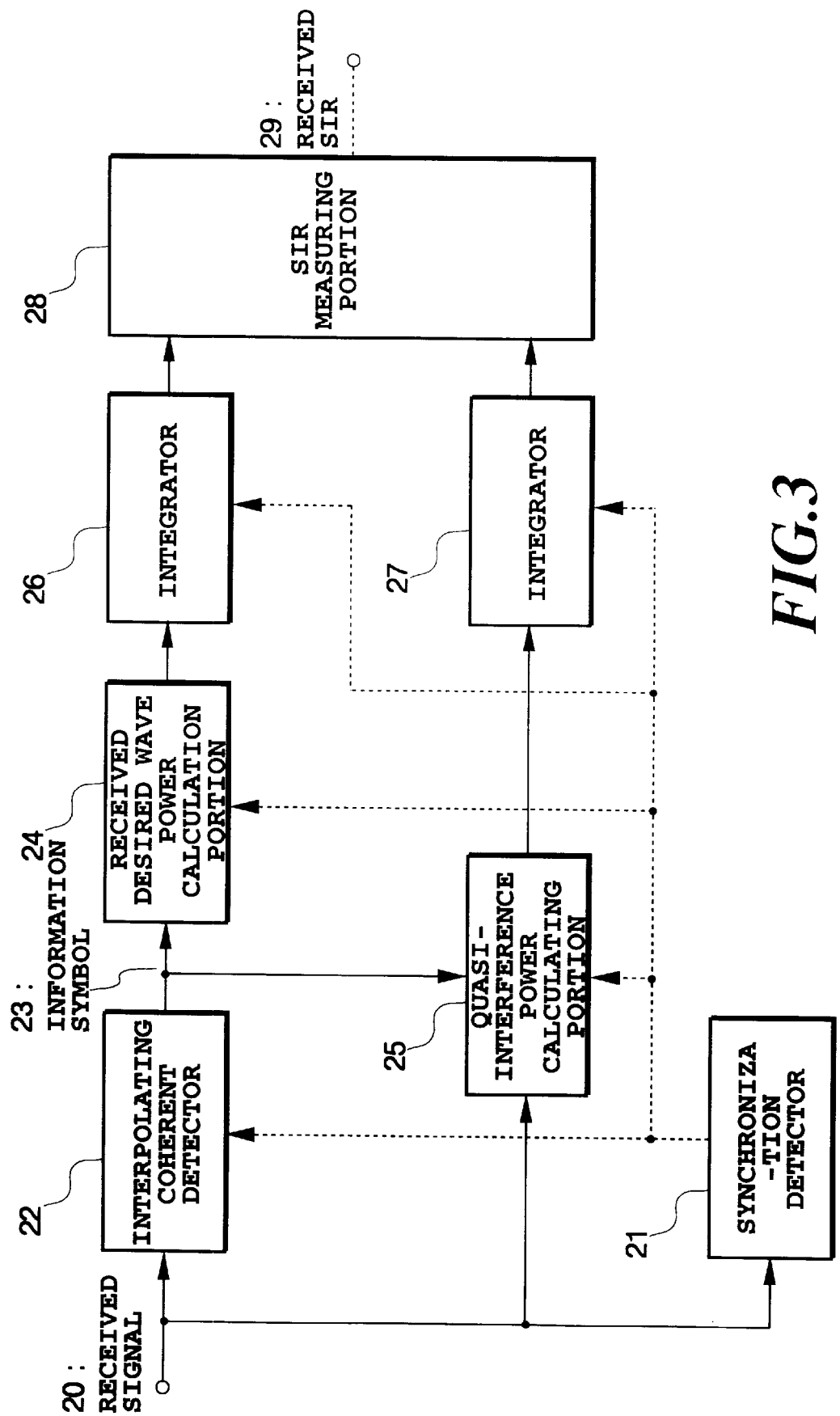
FIG. 3 is a block diagram showing a configuration of a received SIR measuring apparatus.

FIG. 3 shows a configuration of an embodiment of a received SIR measuring apparatus in accordance with the present invention. In this figure, the reference numeral 22 designates an interpolating coherent detector, 24 designates a received desired wave power calculating portion, and 26 designates an integrator. The reference numeral 21 designates a synchronization detector, 25 designates a quasi-interference power calculating portion, 27 designates an integrator, and 28 designates an SIR measuring portion.

With such a circuit configuration, a baseband received signal 20 is input to the synchronization detector 21, which regenerates the clock timings of the symbols and the slot timings, that is, the repetition period of the pilot signal. These timings regenerated by the synchronization detector 21 determine the operation timings of the remaining circuitry. The interpolating coherent detector 22 samples the received signal 20 at the clock timings delivered from the synchronization detector 21, and stores the sampled data in its memory not shown in FIG. 3. The pilot signal in the received signal is extracted in accordance with the slot timings, and is used for estimating the transfer function of its propagation path. This operation is repeated at each of the slot timings, which enables the transfer function to be estimated at that instant. The interpolating coherent detector 22, carrying out the primary interpolation of the transfer functions obtained from the pilots at both ends of the information symbol section, calculates the transfer function corresponding to each information symbol, and compensates for the information symbols. Making decision of each compensated information symbol results in the information symbols 23 which have undergone the absolute phase coherent detection.

The received desired wave power calculating portion 24 obtains the received desired wave power, that is, the square of the distance of each decided information symbol 23 from the point of origin on the complex signal space. On the other hand, the quasi-interference power calculating portion 25 obtains quasi-interference power on the complex signal space from the decided information symbols 23 and the received signal 20. The quasi-interference power can be obtained by computing the differences between the data symbols and the fading envelope at the same sampling timings.

The integrators 26 and 27 integrate the received desired wave power and the quasi-interference power in each slot to obtain their averages. The SIR measuring portion 28 obtains the received SIR 29 by dividing the averaged received desired wave power integral by the averaged quasi-interference power integral.

According to the present invention, a simple system configuration can be implemented because the received SIR is obtained only from the baseband received signal. In addition, highly accurate transmission power control can be implemented using for computing the received SIR the quasi-interference power obtained as the square of the distance between the received signal and the information symbols decided on the complex signal space, which will be described below.

Figure 4B:
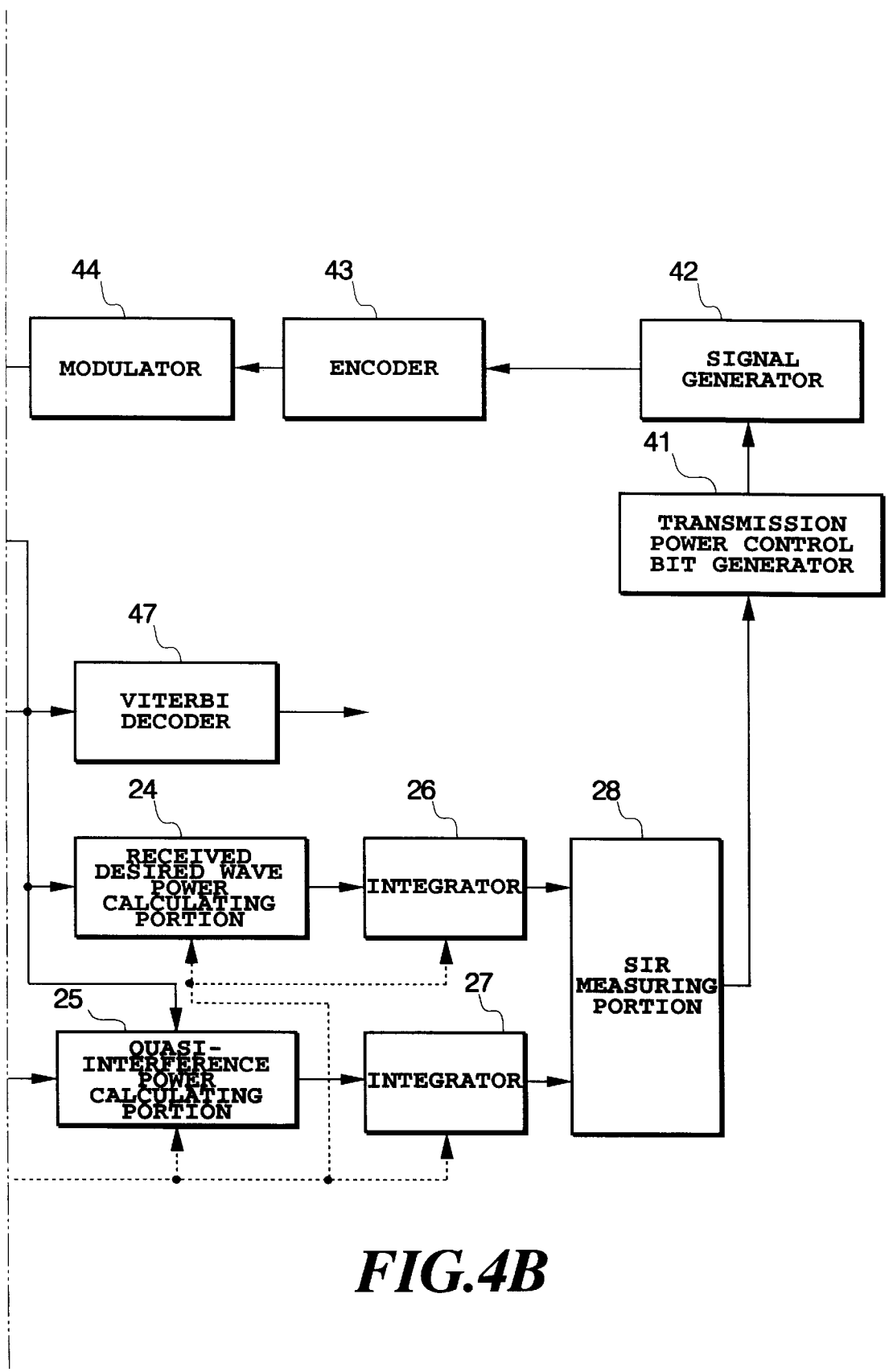
FIG. 4 is a block diagram showing an embodiment of a transmission power control system.

FIG. 4 shows an embodiment of a transmission power control system using the received SIR measuring apparatus described above. In FIG. 4, the reference numeral 30 designates an antenna, 31 designates a duplexer, 32 designates a receiving radio frequency stage, 33 designates a despreader, 21 designates a synchronization detector, 22 designates an interpolating coherent detector, 24 designates a received desired wave power calculating portion, 25 designates a quasi-interference power calculating portion, 26 and 27 each designate an integrator, 28 designates an SIR measuring portion, 41 designates a transmission power control bit generator, 42 designates a signal generator, 43 designates an encoder, 44 designates a modulator, 45 designates a spreader, 46 designates a transmitting radio frequency stage, 47 designates a Viterbi decoder, 48 designates a transmission power control bit extractor and 49 designates a transmission power controller. The blocks like those of FIG. 3 are denoted by the same reference numerals.

The operation will now be described when the transmitter with the configuration is applied to a mobile station.

A spread spectrum signal transmitted from a base station is received by the antenna 30. The received signal is input to the receiving radio frequency stage 32 through the duplexer 31. The receiving radio frequency stage 32 passes the received signal through a bandpass filter (BPF) to remove the components outside the passband, amplifies it, and carries out the frequency conversion to an intermediate frequency band (IF band) using the clock signal generated by a local oscillator. The received signal which has been frequency converted to the IF band is passed through a BPF, corrected to an appropriate level by an automatic-gain controller (AGC), and quasi-coherent detected, thereby frequency converted into a baseband. The received signal thus frequency converted to the baseband is passed through the lowpass filter (LPF), undergoes analog-to-digital conversion (A/D conversion), and output as a digital signal. The digital received signal output from the receiving radio frequency stage 32 is despread by the despreader 33, and output as a narrow-band modulated signal. The signal output from the despreader 33 is demodulated by the interpolating coherent detector 22. The information signal in the demodulated signal is decoded by the Viterbi decoder, and is output. The transmission power control bits are extracted by the transmission power control bit extractor 48, and are fed to the transmission power controller 49. The transmission power controller 49 determines the transmission power in accordance with the transmission power control bits, and outputs the resultant control information to the transmitting radio frequency stage 46. On the other hand, the received SIR is obtained from the received signal despread by the despreader 33 as described above in connection with FIG. 3.

The transmission power control bit generator 41 compares the received SIR with a predetermined target SIR. If the received SIR is smaller than the target SIR, the control bits commanding an increase of the transmission power are generated, whereas if the received SIR is greater than the target SIR, the control bits commanding a decrease of the transmission power are generated, and the control bits are supplied to the signal generator 42. The signal generator 42 assembles the transmitted frame including the transmission power control bits fed from the transmission power control bit generator 41, and supplies it to the encoder 43. The encoded transmitted signal is modulated by the modulator 44, spread by the spreader 45, and is fed to the transmitting radio frequency stage 46. The transmitting radio frequency stage 46 carries out the frequency conversion of the transmitted signal to the IF band and then to the RF band, and transmits it at the transmission power corresponding to the control information output from the transmission power controller 49.

The power calculation of the received desired wave and received interference wave will now be described in detail using the complex signal space.

The power measurement of the received desired wave will be described with reference to FIGS. 5 and 6.

Figure 5:
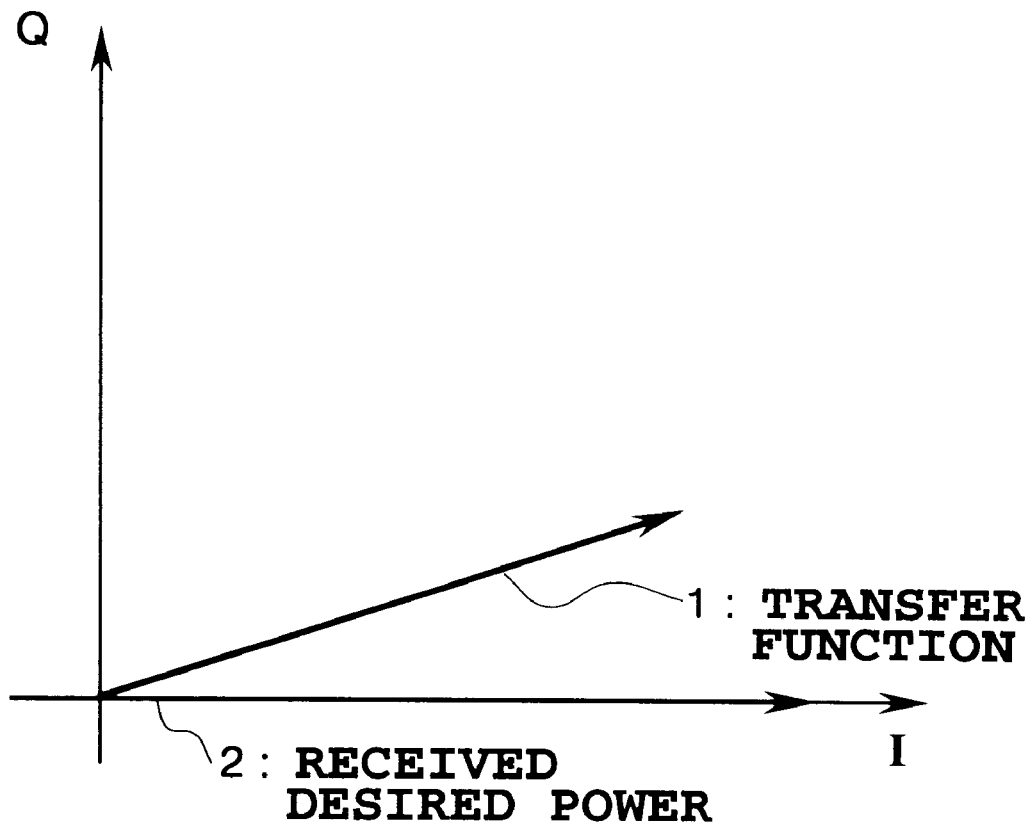
FIG. 5 is a diagram illustrating a received desired wave power measurement described on a complex signal space.

FIG. 5 illustrates on the complex signal space the received desired wave power measurement. A transfer function 1 is obtained by primarily interpolating into the information symbol section the transfer functions obtained from the pilot signals. The transfer functions at respective information symbols are averaged within each slot. The received desired wave power 2 can be obtained by computing the square of the distance of the averaged transfer function.

Thus, the received desired wave power measurement can be achieved by using at the receiving side the coherent detector for carrying out the coherent detection of the signal consisting of the information signal and the pilot signal with a known pattern inserted into the information signal at the predetermined period at the transmitting side. Specifically, it can be implemented by computing on the complex signal space of the baseband the power values of the fading envelope using the interpolation of the pilot signal, by averaging the power values in the sections at the predetermined pilot signal intervals, and by adopting the averaged value as the received desired wave power.

Figure 6:
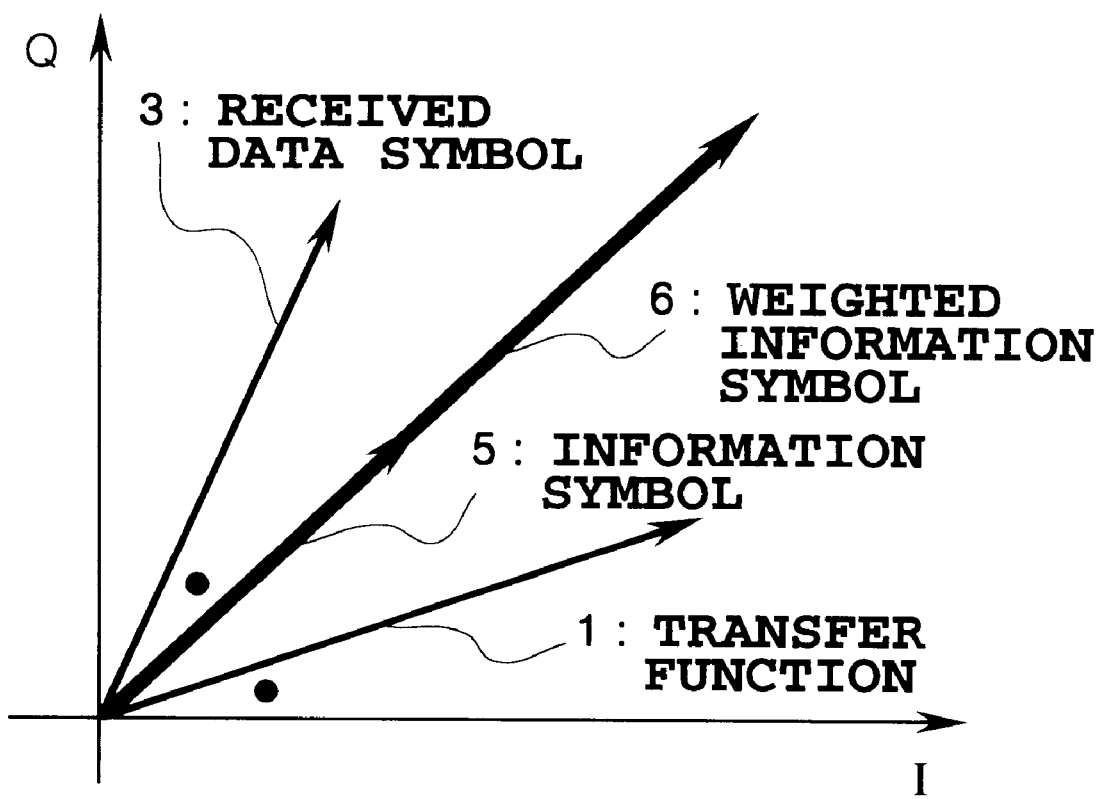
FIG. 6 is a diagram illustrating another received desired wave power measurement described on a complex signal space.

FIG. 6 illustrates on the complex signal space another received desired wave power measuring method. Dividing the received data symbol 3 by the transfer function 1 gives a provisional information symbol 5 whose transfer function is compensated for. Then, a weighted information symbol 6 is obtained by multiplying the provisional information symbol 5 by the square of the transfer function 1. The weighted information symbol 6 equals the product of the received data symbol 3 and the complex conjugate of the transfer function 1. The received desire wave power is obtained by compensating for the phase of the weighted information symbol 6 with the position of the signal point on the complex signal space, by averaging the compensated values in each slot, and by adopting the square of the distance of the average as the received desired wave power.

Thus, the received desired wave power measurement can be achieved on the complex signal space by computing the ratio of the received data symbols to the fading envelope obtained by interpolating the pilot signals, by multiplying the ratio by the square of the fading envelope, by averaging the product in the section at the pilot signal interval, and by adopting the square of the absolute value of the average as the received desired wave power.

Next, the power measurement of the received interference wave will be described with reference to FIGS. 7–9.

Figure 7:
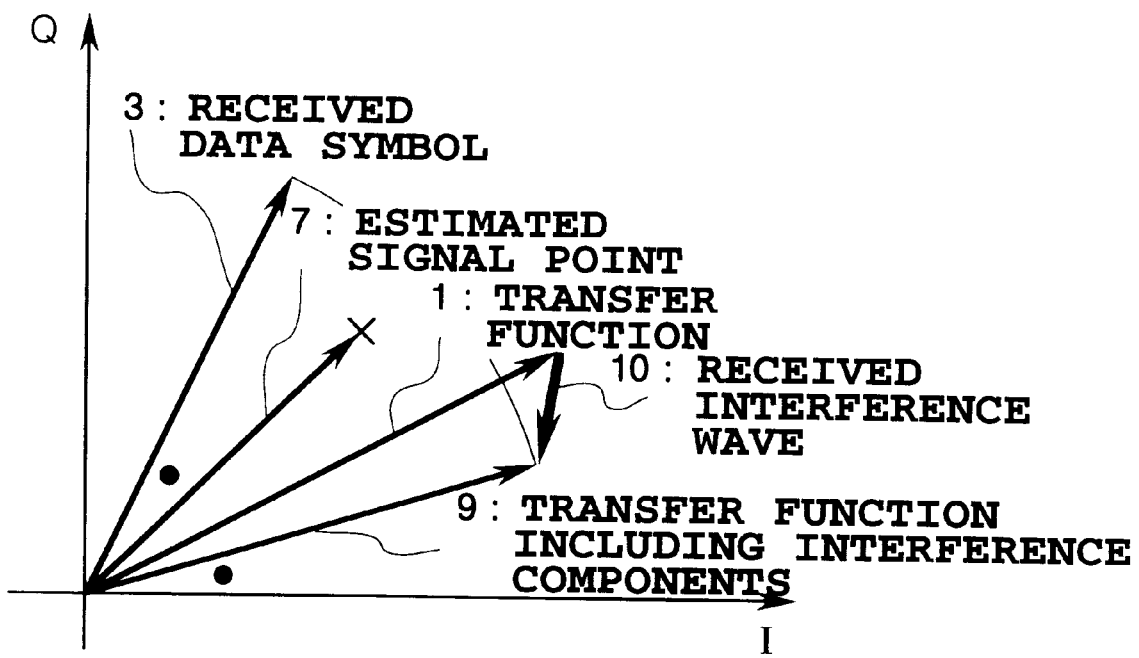
FIG. 7 is a diagram illustrating a received interference wave power measurement described on a complex signal space.

FIG. 7 illustrates on the complex signal space a received interference wave power measurement. An estimated signal point 7 can be obtained by checking the quadrant on the complex signal space in which the weighted information symbol 7 is present. The estimated signal point 7 is determined by the modulation scheme of the symbol, having a magnitude of unity and an angle of 45 degrees in each quadrant. Then, the received data symbol 3 is divided by the estimated signal point 7 to obtain a transfer function 9 including interference components.

Since the estimated signal point 7 is located on the circumference of a unit circle, the transfer function 9 including the interference components can be obtained by rotating the received data symbol 3 about the axis of the unit circle. An interference wave 10 can be obtained as the difference between the transfer function 1 and the transfer function 9 including the interference components. The received interference wave power can be obtained by averaging the square of the distance of the received interference wave 10 in one slot.

Thus, the received interference wave power measurement can be achieved on the complex signal space by computing the ratio of the received data symbols to the fading envelope obtained by the interpolation, by multiplying the ratio by the square of the fading envelope, by deciding the signal point from their product, by computing the fading envelope including the interference components using the received data symbols and the decision value, by computing the difference between the computed value and the fading envelope obtained by the interpolation, by integrating the square of the difference in the section at the pilot signal interval, by averaging the integrals over a plurality of sections at the pilot signal intervals, and by adopting the average as the received interference wave power.

Figure 8:
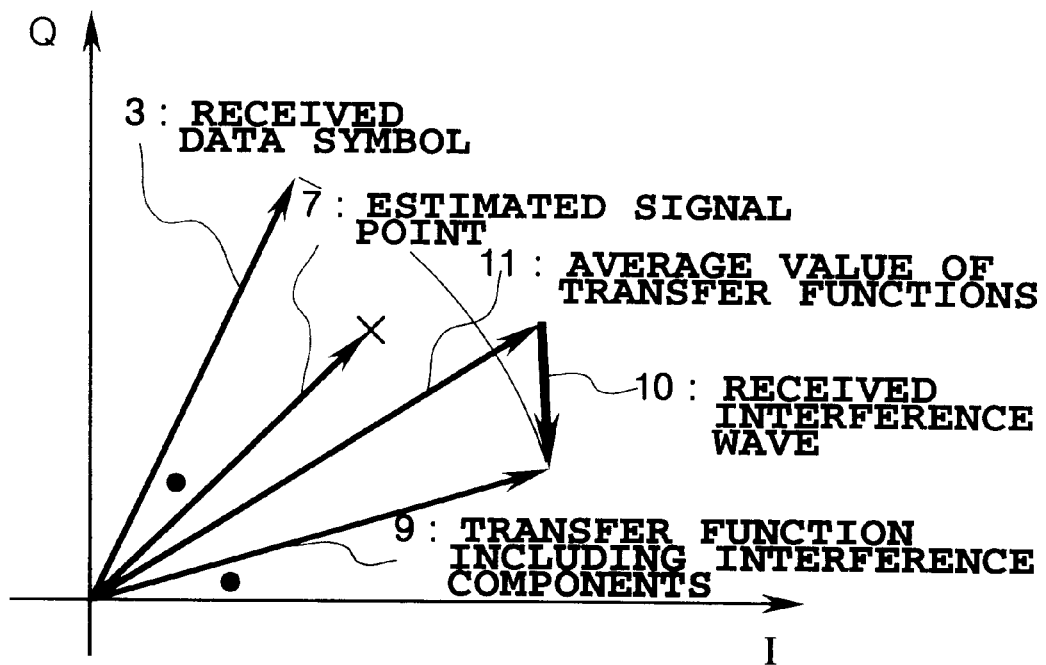
FIG. 8 is a diagram illustrating another received interference wave power measurement described on a complex signal space.

FIG. 8 illustrates on the complex signal space another received interference wave power measurement. The received interference wave 10 can be obtained as the difference between the transfer function 9 including the interference components and the average value 11 of the transfer functions 9.

The received interference wave power can be obtained by integrating the square of the distance of the received interference wave 10 in each slot, and by averaging the integrals over a plurality of slots. Alternatively, the received interference wave power can be obtained by integrating the square of the distance of the received interference wave 10 in the pilot section, and by averaging the integrals over a plurality of slots.

Thus, the received interference wave power measurement can be achieved on the complex signal space by computing the ratio of the received data symbols to the fading envelope obtained by the interpolation, by multiplying the ratio by the square of the fading envelope, by deciding the signal point from their product, by computing the fading envelope including the interference components using the received data symbols and the decision value, by computing the average of the received data symbols in the section at the pilot signal interval, by computing the difference between the computed average value and the fading envelope obtained by the interpolation, by integrating the square of the difference in the section at the pilot signal interval, by averaging the integrals over a plurality of sections at the pilot signal intervals, and by adopting the average as the received interference wave power.

Likewise, the received interference wave power measurement can be achieved on the complex signal space by computing the ratio of the received data symbols to the fading envelope obtained by the interpolation, by multiplying the ratio by the square of the fading envelope, by deciding the signal point from their product, by computing the fading envelope including the interference components using the received data symbols and the decision value, by computing the average of the received data symbols in the section at the pilot signal interval, by computing the difference between the computed average value and the fading envelope obtained by the interpolation, by integrating the square of the difference in the section only of the pilot signal, by averaging the integrals over a plurality of sections at the pilot signal intervals, and by adopting the average as the received interference wave power.

Figure 9:
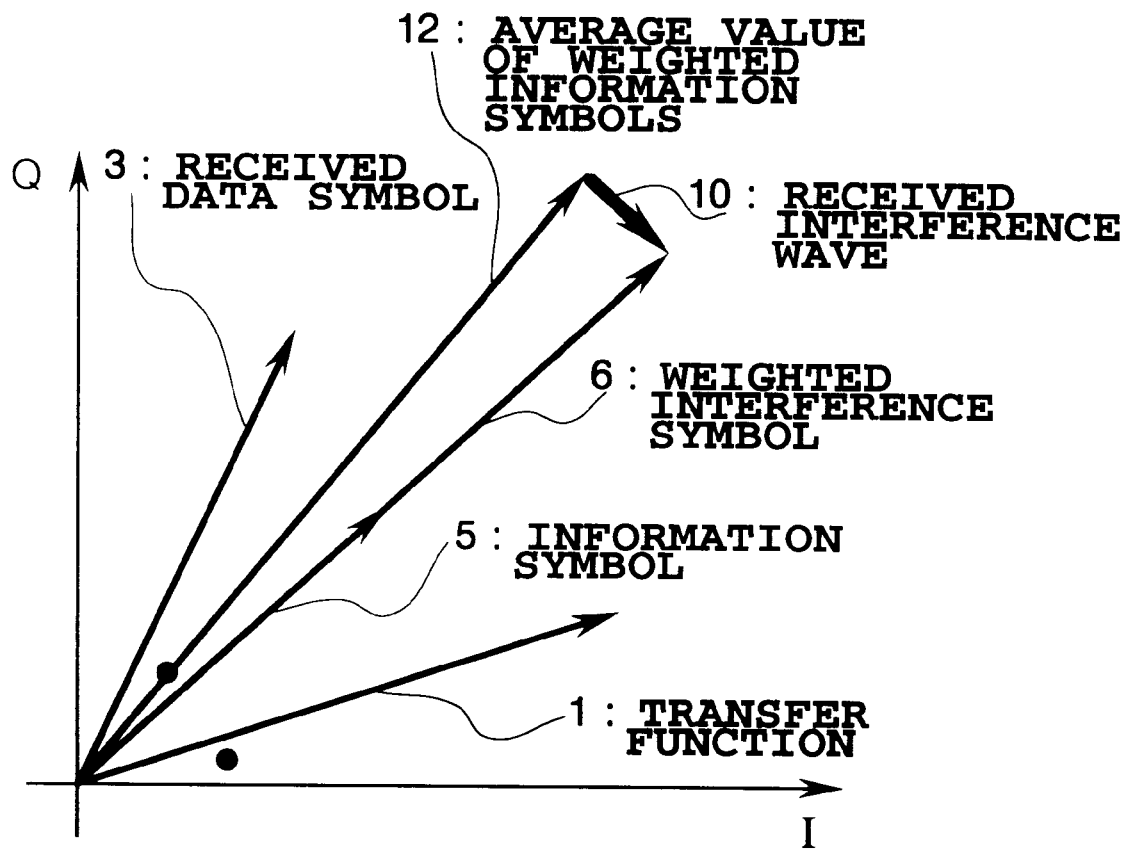
FIG. 9 is a diagram illustrating still another received interference wave power measurement described on a complex signal space.

FIG. 9 illustrates on the complex signal space still another received interference wave power measurement. An average value 12 of weighted information symbols can be obtained by compensating the weighted information symbols 6 for their phases with the positions of the signal point on the complex signal space, and by averaging the compensated values in each slot. The received interference wave 10 can be obtained as the difference between each weighted information symbol 6 and their average value 12.

Thus, the received interference wave power measurement can be achieved on the complex signal space by computing the ratio of the received data symbols to the fading envelope obtained by the interpolation, by multiplying the ratio by the square of the fading envelope, by computing the average of the resultant product in the section at the pilot signal interval, by computing the difference between the computed average value and the resultant product, by integrating the square of the difference in the section at the pilot signal interval, by averaging the integrals over a plurality of sections at the pilot signal intervals, and by adopting the average as the received interference wave power.

Next, referring to FIGS. 10–14, concrete configurations will be described for implementing the power measurements of the received desired wave and the received interference wave described above on the complex signal space.

Figure 10:
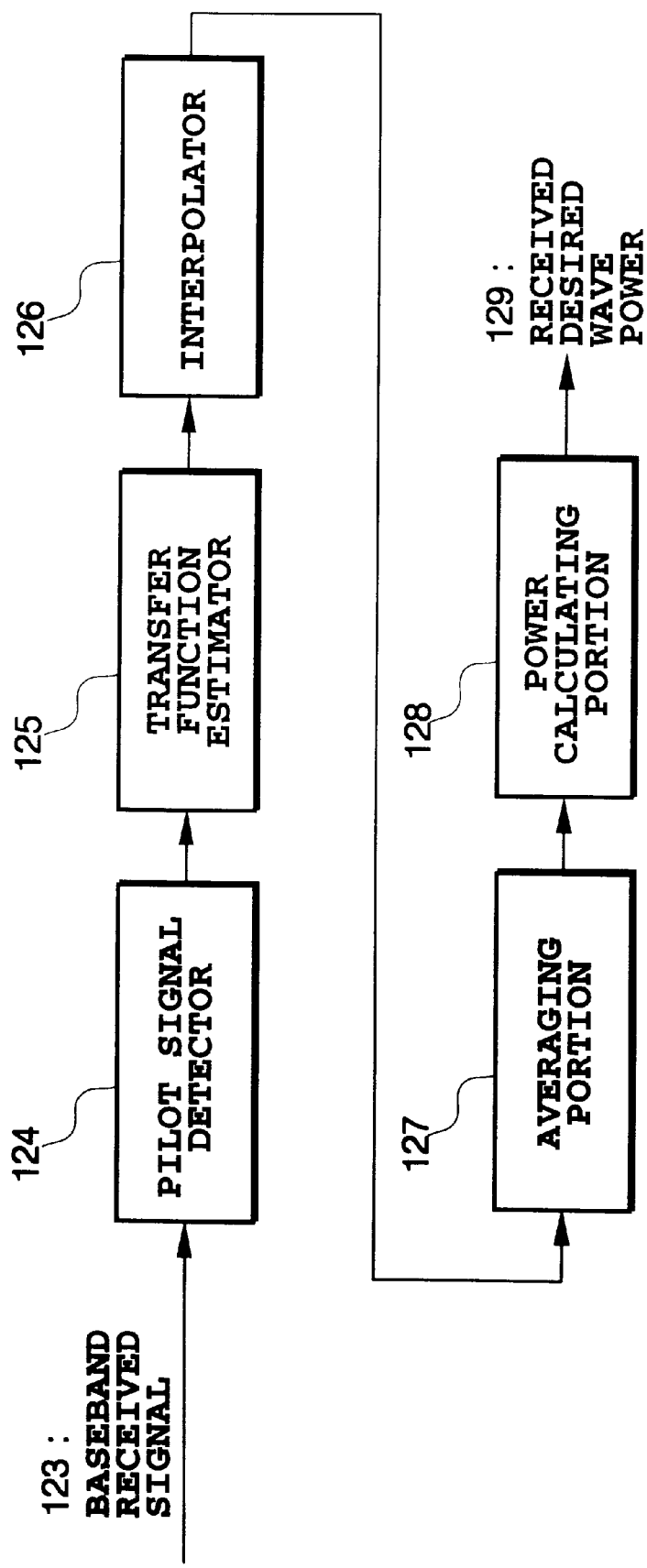
FIG. 10 is a block diagram for implementing a received desired wave power measurement.

FIG. 10 is a block diagram for carrying out the received desired wave power measurement described above on the complex signal space in FIG. 5.

The baseband received signal 123 is supplied to a pilot signal detector 124. A transfer function estimator 125 estimates the transfer function corresponding to the pilot signal using the pilot signal detected by the pilot signal detector 124. An interpolator 126 obtains the transfer functions corresponding to the information symbols by primarily interpolating the transfer functions obtained from the pilot signals located at both ends of the information symbol section. An averaging portion 127 averages in each slot the transfer functions obtained by the interpolator 126, and a power calculating portion 128 computes the power of the average value obtained by the averaging portion 127. The resultant power computed by the power calculating portion 128 is output as received desired wave power 129.

Figure 11:
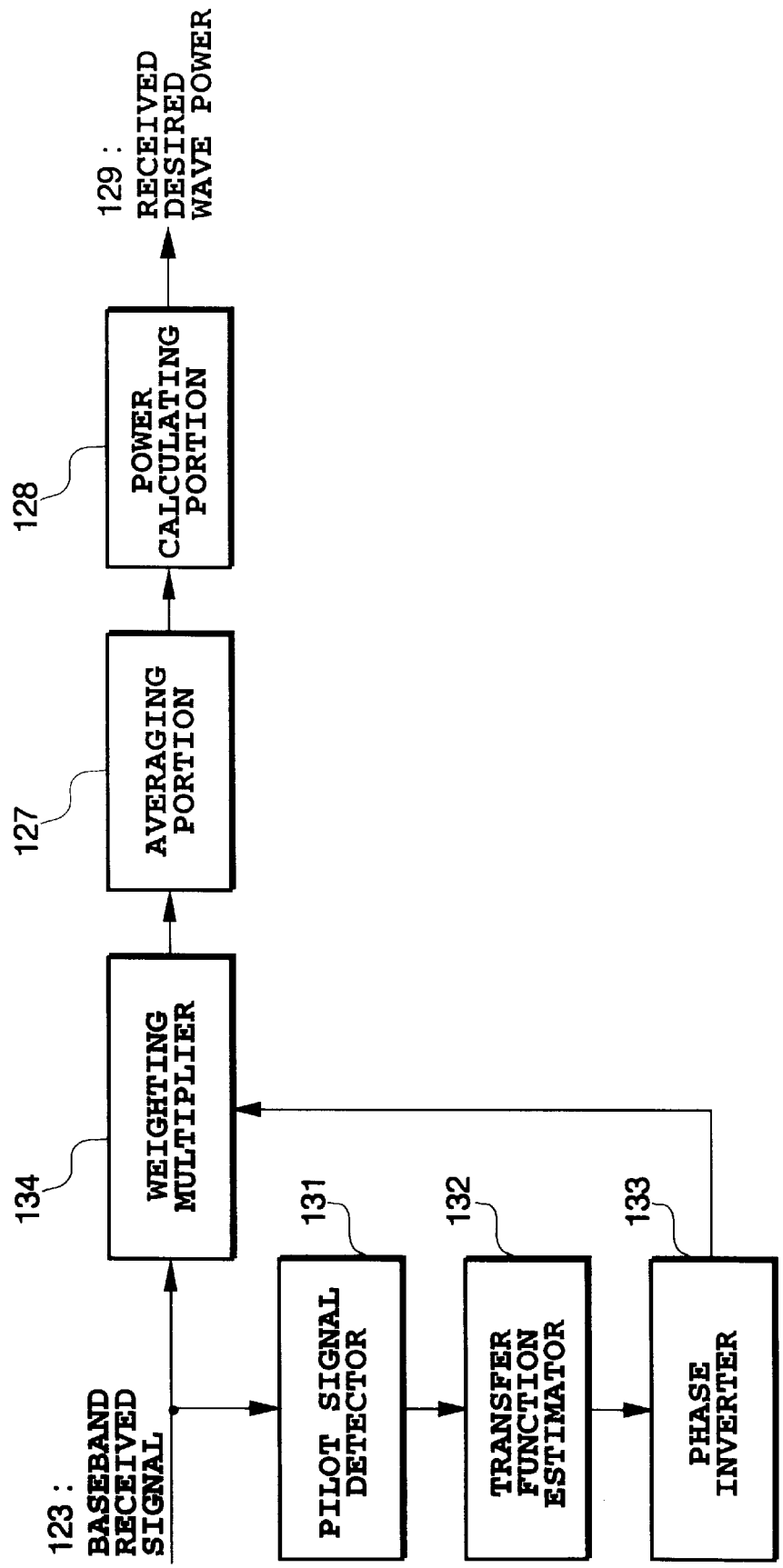
FIG. 11 is a block diagram for implementing another received desired wave power measurement.

FIG. 11 is a block diagram for implementing the received desired wave power measurement described above on the complex signal space in FIG. 6. In FIG. 11, the blocks like those of FIG. 10 are designated by the same reference numerals.

The baseband received signal 123 is supplied to a pilot signal detector 131 and a weighting multiplier 134. The output of a transfer function estimator 132 is passed through a phase inverter 133 for taking its complex conjugate, and is input to the weighting multiplier 134. The multiplier 134 (weighting multiplier 134) multiplies the received signal 123 by the estimated function to obtain a signal from which the fading has been removed. The averaging portion 127 averages the output of the multiplier 134 in one slot, and the power calculating portion 128 computes the power of the average value obtained by the averaging portion 127. The resultant power computed by the power calculating portion 128 is output as the received desired wave power 129.

Figure 12:
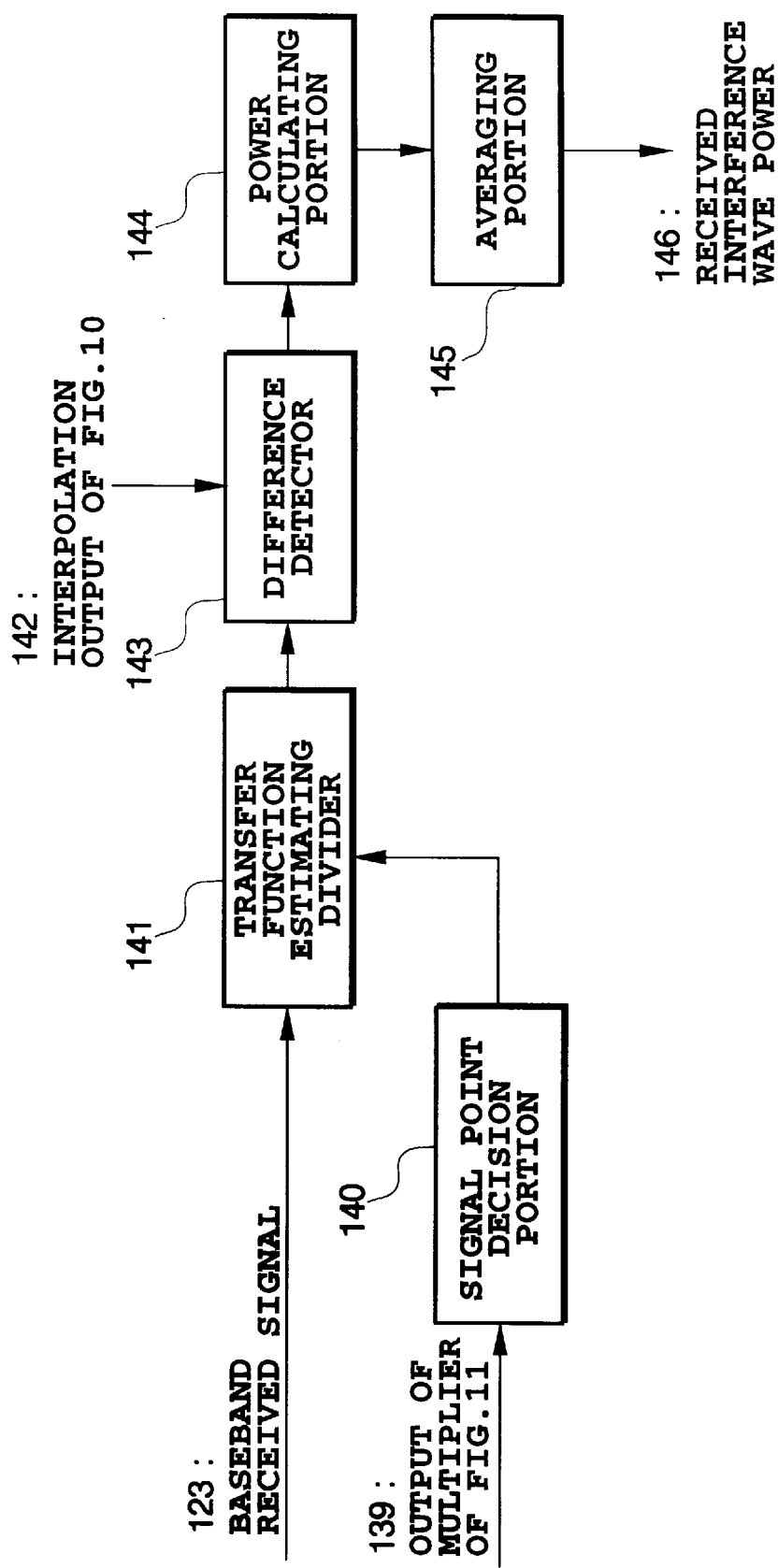
FIG. 12 is a block diagram for implementing a received interference wave power measurement.

FIG. 12 is a block diagram for implementing the received interference wave power measurement described on the complex signal space in FIG. 5.

An output of a multiplier 139 corresponds to the output of the weighting multiplier 134 in FIG. 11, and an interpolation output 142 corresponds to the output from the interpolator 126 in FIG. 10.

The baseband received signal 123 is input to a transfer function estimating divider 141, and the multiplier output 139 is input to a signal point decision portion 140. The signal point decision portion 140 decides the signal point of each information symbol by checking the quadrant in which the multiplier output 139 is present. The transfer function estimating divider 141 outputs the ratio of the baseband received signal 123 to the signal point. A difference detector 143 outputs a difference between the ratio and the interpolation output 142. After calculating the power of the difference in a power calculating portion 144, an averaging portion 145 averages the power in one slot, and outputs the average value as received interference wave power 146.

Figure 13:
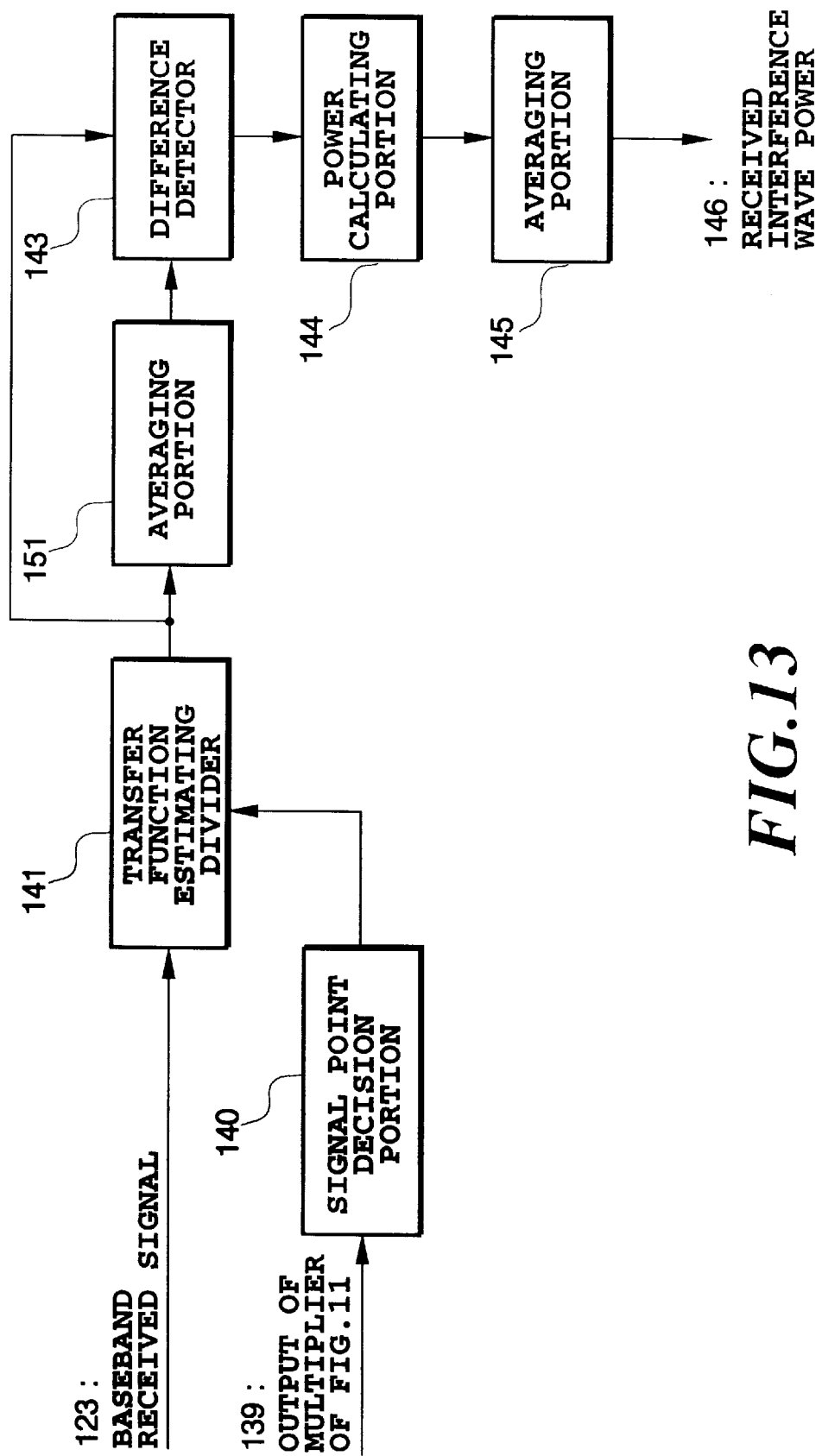
FIG. 13 is a block diagram for implementing another received interference wave power measurement.

FIG. 13 is a block diagram for implementing the received interference wave power measurement described above on the complex signal space in FIG. 7. The same reference numerals as those of the foregoing drawing designate like components.

The baseband received signal 123 is input to the transfer function estimating divider 141. An averaging portion 151 computes the average value of the transfer function in each slot, or in each pilot section.

The difference detector 143 outputs the differences between the average value and the output of the transfer function estimating divider 141. The power calculating portion 144 calculates and outputs the power of the differences. The averaging portion 145 averages the power in each slot, or in each pilot section. The average value is output as the received interference wave power 146.

Figure 14:
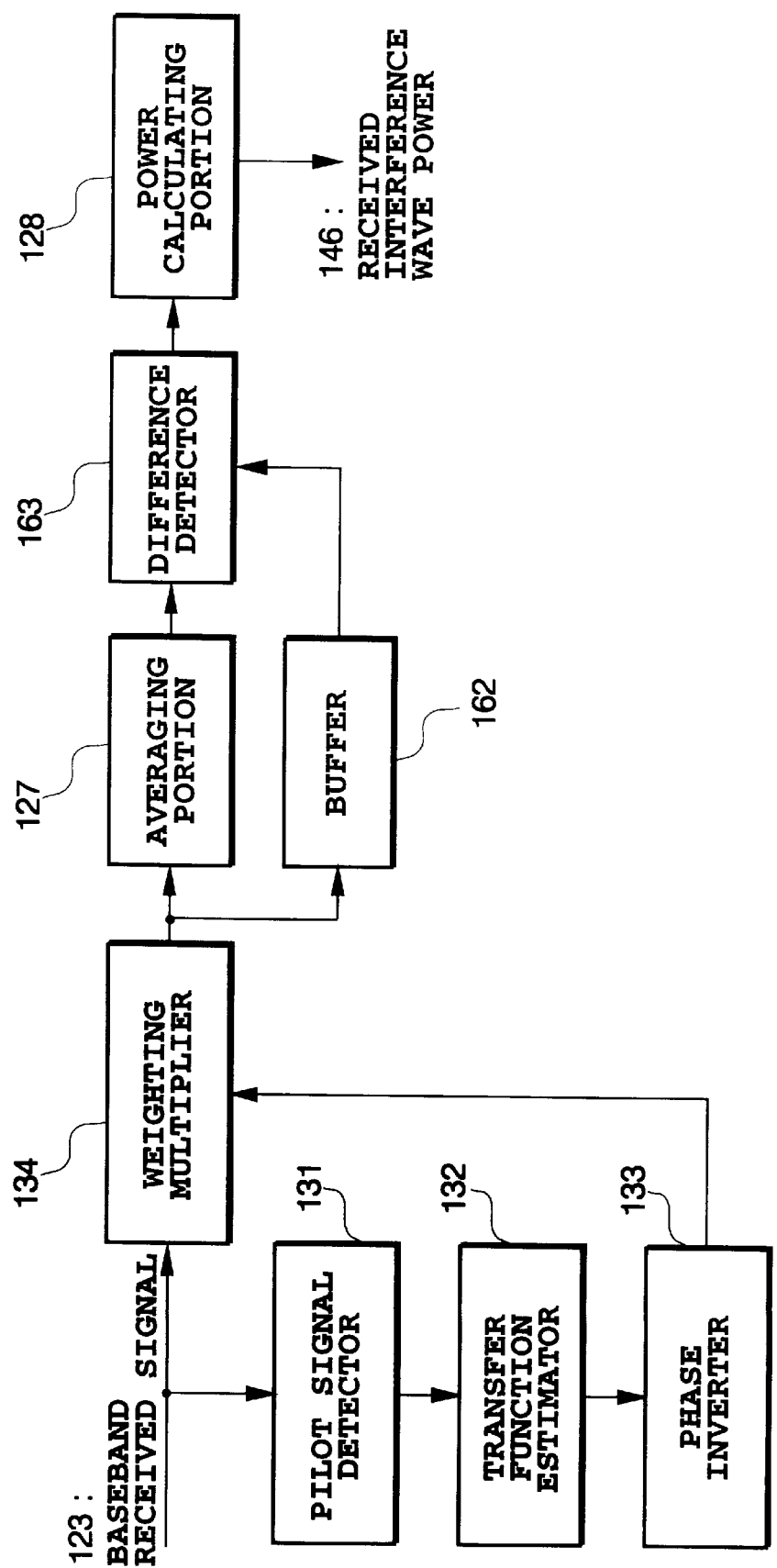
FIG. 14 is a block diagram for implementing still another received interference wave power measurement.

FIG. 14 is a block diagram for implementing the received interference wave power measurement described above on the complex signal space in FIG. 7. In FIG. 14, the same block as those of the foregoing drawing are designated by the same reference numerals.

The baseband received signal 123 is supplied to the pilot signal detector 131 and weighting multiplier 134. The output of the transfer function estimator 132 is passed through the phase inverter 133 for taking its complex conjugate, and is input to the weighting multiplier 134. The output of the multiplier 134 is input to the averaging portion 127 and a buffer 162. The buffer 162 is used for holding the multiplier outputs of one slot while averaging the multiplier outputs. After the averaging portion 127 averages the outputs of the multiplier in one slot, a difference detector 163 computes the difference between the buffer output and the average value. Then, the power calculating portion 128 computes the power of the output of the difference detector 163. The resultant power computed by the power calculating portion 128 is output as the received interference wave power 146.

The blocks of the power measurement of FIGS. 10–14 can be implemented using a DSP (Digital Signal Processor).

FIG. 15 is a block diagram of the received SIR measuring apparatus.

The received SIR measuring apparatus applies the configurations for measuring the received desired wave power and received interference wave power described above in connection with FIGS. 10–12.

The synchronization detector 21 generates a synchronizing signal from the baseband received signal 123, and supplies it to portions requiring it. The SIR computation divider 28 computes the ratio of the received desired wave power 129 to the received interference wave power 146, which is output as a received SIR 182.

It is obvious that various configurations can be implemented to obtain the received SIR by combining the configurations for measuring the received desired wave power and the received interference wave power as shown in FIGS. 10–14.

Figure 16B:
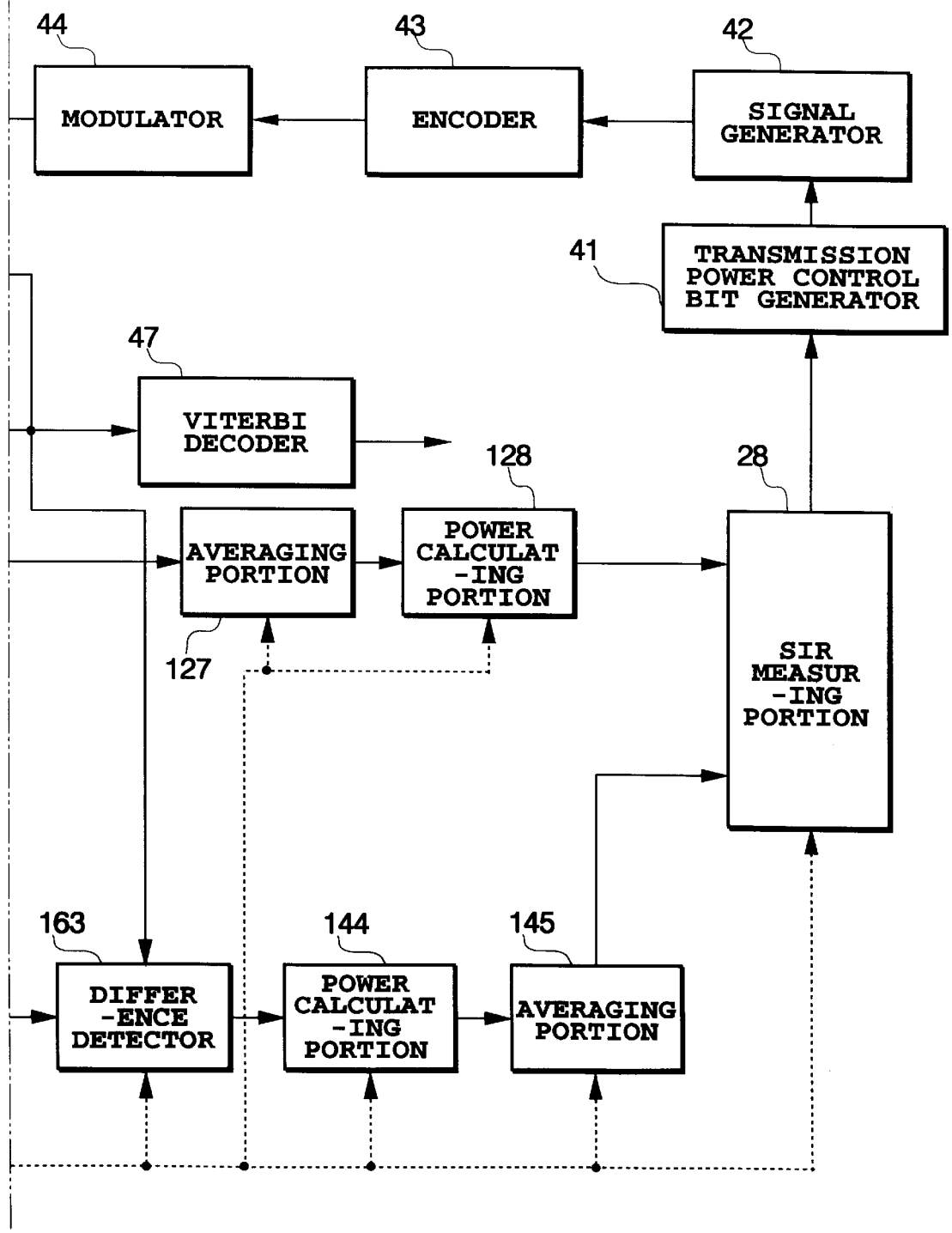
FIG. 16 is a block diagram showing an embodiment of a transmission power control system.

FIG. 16 shows an embodiment of a transmission power control system applying the foregoing received SIR measurement.

In FIG. 16, the reference numeral 30 designates an antenna, 31 designates a duplexer, 32 designates a receiving radio frequency stage, 33 designates a despreader, 22 designates an interpolating coherent detector, 133 designates a phase inverter, 134 designates a weighting multiplier, 140 designates a signal point decision portion, 141 designates a transfer function estimating divider, 21 designates a synchronization detector, 47 designates a Viterbi decoder, 127 designates an averaging portion, 163 designates a difference detector, 144 designates a power calculating portion, 145 designates an averaging portion, 128 designates a power calculating portion, 28 designates an SIR measuring portion, 41 designates a transmission power control bit generator, 42 designates a signal generator, 43 designates an encoder, 44 designates a modulator, 45 designates a spreader, 46 designates a transmitting radio frequency stage, 48 designates a transmission power control bit extractor and 49 designates a transmission power controller. In FIG. 16, the interpolating coherent detector 22 corresponds to the pilot signal detector 124, transfer function estimator 125 and interpolator 126 in FIG. 15.

The received SIR measurement is carried out as described above in connection with FIG. 13.

The transmission power control bit generator 41 compares the measured received SIR with the predetermined target SIR, and sets the transmission power control bits such that the transmission power is decreased when the received SIR exceeds the target SIR, and the transmission power is increased when the received SIR is below the target SIR.

In the receiving station, on the other hand, the transmission power control bit extractor 48 extracts the transmission power control bits from the baseband signal after the interpolating coherent detection, and the transmission power controller 49 increases or decreases the transmission power in response to the transmission power control bits.

Figure 17:
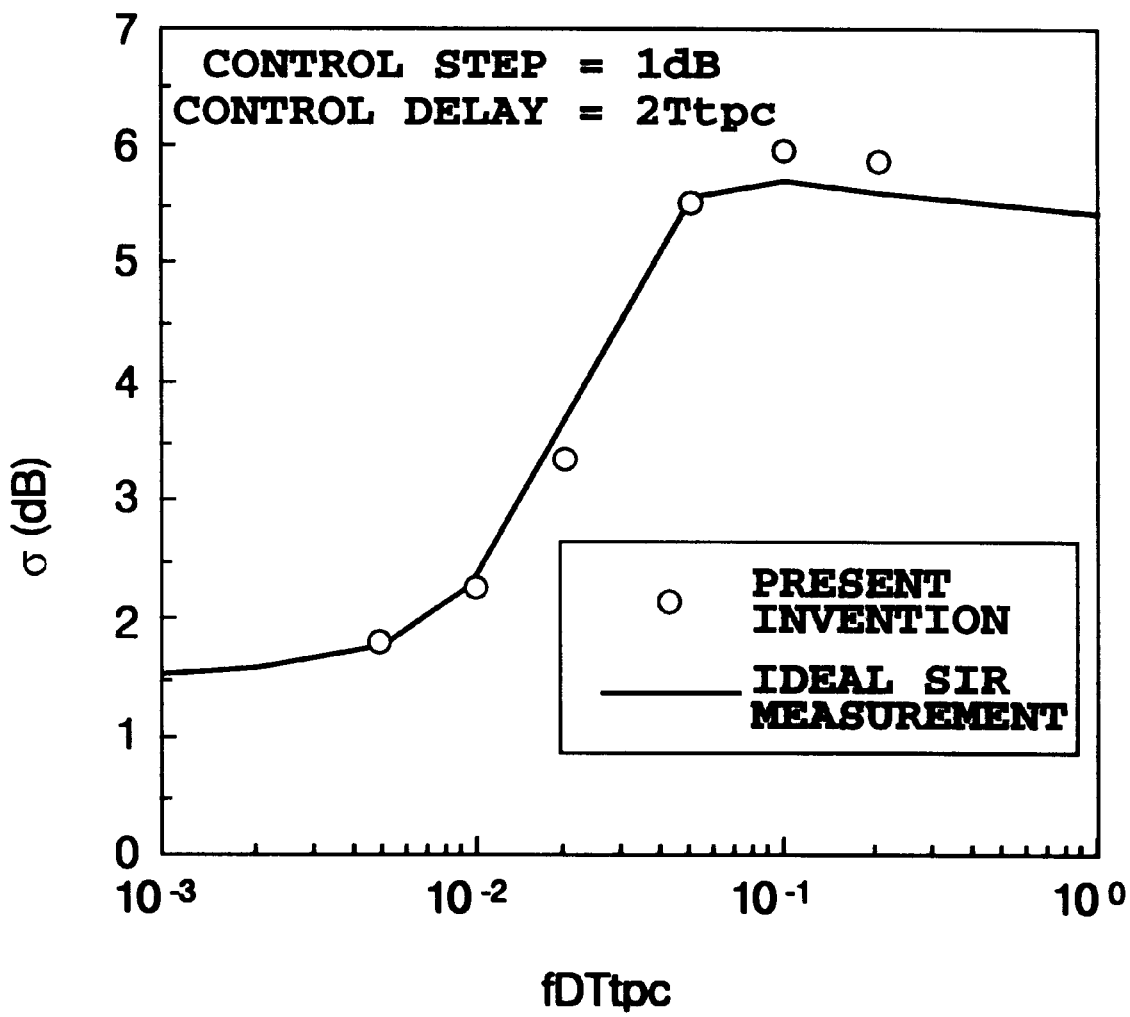
FIG. 17 is a graph illustrating transmission power control error characteristics of the transmission power control system.

FIG. 17 is a graph illustrating the error characteristics of the transmission power control when the present invention is applied, in which the horizontal axis represents the maximum Doppler fDTtpc normalized by the power control interval (slot), and the vertical axis represents the standard deviation of the differences between the received SIR and the target SIR. Here, the transmission power control step is set at 1 dB, and the control delay is set at 2Ttpc. The solid line indicates characteristics when the received SIR was perfectly measured, and open circles plotted indicate characteristics when the present invention is applied. The graph shows that the present invention can achieve the characteristics which is little inferior to the ideal case.

Furthermore, it is apparent from the graph that the control error is nearly saturated when the fDTtpc is large. This is because the transmission power control cannot follow the instantaneous fluctuations as the fading rate increases. Accordingly, it is possible to save the power of the system by detecting the rate of the fading, and suspending the transmission power control during the fast fading.

Figure 18B:
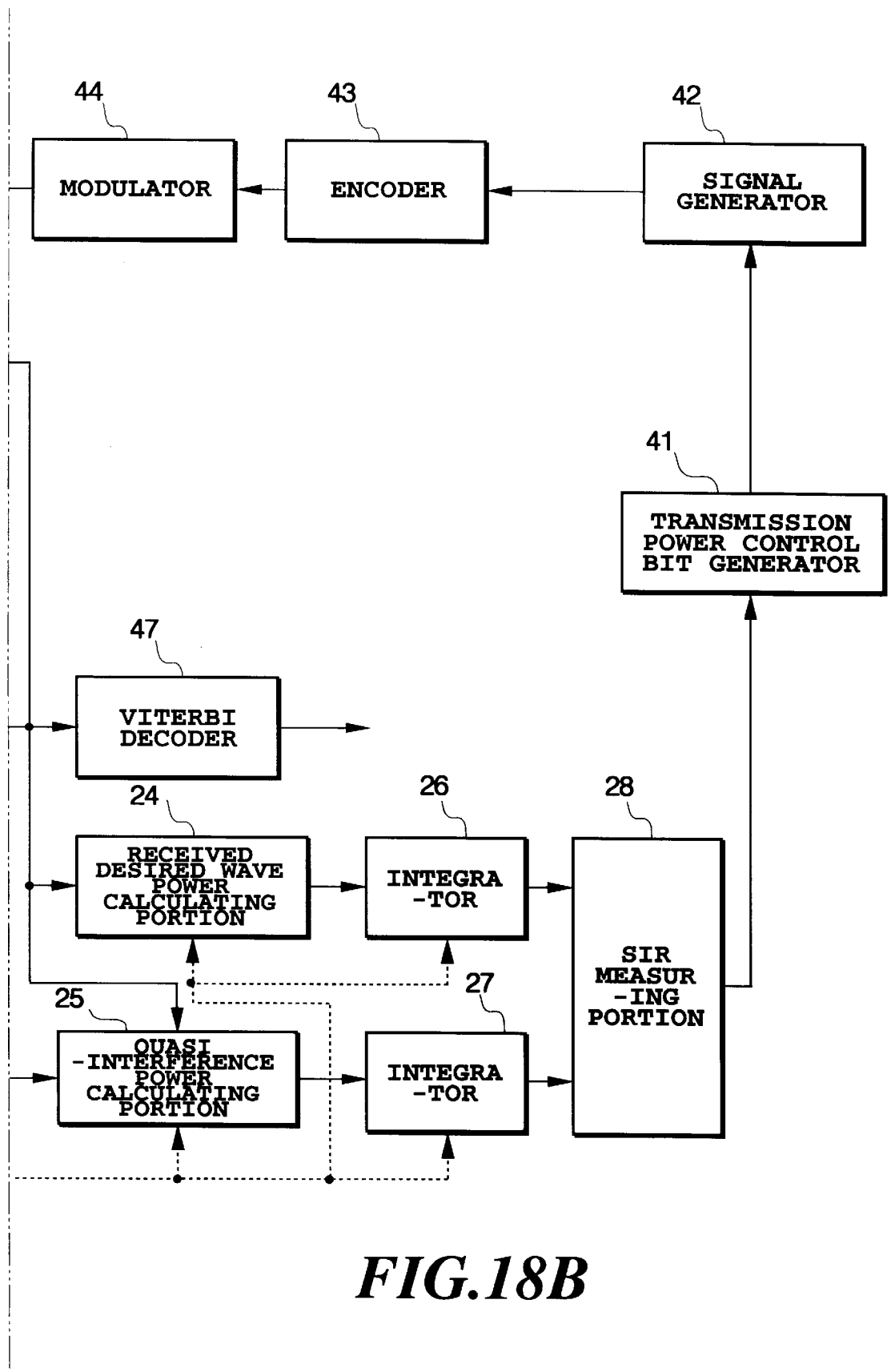
FIG. 18 is a block diagram showing another embodiment of a transmission power control system.

FIG. 18 shows an embodiment of the transmission power control system for suspending the transmission power control by detecting the fast fading, in which like portions are designated by the same reference numerals as in the foregoing figure. In FIG. 18, the reference numeral 50 designates a fading envelope power variation amount detector, and 51 designates a fading envelope power variation amount comparator.

In FIG. 18, the fading envelope power variation amount detector 50 detects the power of the pilot symbols which are located at both ends of the frame and used for the interpolation, and obtains their difference. The difference represents the power variation amount of the fading envelope. The fading envelope power variation amount comparator 51 compares the difference with a predetermined allowable variation amount and in terms of the absolute value of the power variation amount. When the variation amount of the fading envelope exceeds the allowable amount, the fading envelope power variation amount comparator 51 commands the transmitting radio frequency stage 46 to stop the transmission power control by providing it with the information of suspending the transmission power control. If the variation amount of the fading envelope returns to less than the allowable amount, the fading envelope power variation amount comparator 51 supplies the transmitting radio frequency stage 46 with the information to restart the transmission power control so that the transmission power control based on the control information fed from the transmission power controller 49 is restarted.

By thus suspending the transmission power control, the power saving of the entire system can be achieved.

What is claimed is:

1. A received SIR (signal-to-interference plus noise power ratio) measuring method of a communications system using a signal including a known pilot signal inserted into an information signal at predetermined intervals, said method comprising:

the step of measuring received wave power in which average value is adopted as the received wave power wherein the step of measuring received wave power comprising steps of:

carrying out interpolating coherent detection of information data symbols from received data symbols by using the pilot signal;

computing power values of the information data symbols decided by interpolation integrating the power values of the information data symbols in the predetermined interval of the pilot signal to compute said average value of the power values;

the step of measuring received interference wave power in which a ratio is computed of an integral of the information data symbols to an integral of the power differences wherein the step of measuring received interference wave power comprising steps of:

computing differences between power values of the decided information data symbols and power values of a fading envelope at same sampling times;

obtaining an integral of said differences of the power values in the predetermined intervals of the pilot signal; and the step of computing a ratio of the received desired wave power to the received interference wave power, wherein the step of measuring received interference wave power comprising steps of the computed ratio is adopted as the SIR.

2. A received SIR (signal-to-interference plus noise power ratio) measuring method of a communications system using a signal including a known pilot signal inserted into an information signal at predetermined intervals, said method comprising:

computing power values of a fading envelope obtained by interpolation;

the step of measuring received desired wave power which includes the step of averaging the power values in a section between successive pilot signals, and which adopts the obtained average value as the received desired wave power;

the step of measuring received interference wave power which obtains received interference wave power from received data symbols and the fading envelope obtained by the interpolation; and the step of computing a ratio of the received desired wave power to the received interference wave power, wherein the computed ratio is adopted as the SIR.

3. The received SIR measuring method as claimed in claim 2, wherein said step of measuring the received interference wave power comprises the steps of:

computing ratios of the received data symbols to a fading envelope obtained by interpolation;

multiplying the ratios by a square of the fading envelope, and making a decision of signal points from results of the multiplication;

computing a fading envelope including interference components using the received data symbols and the decision values; computing differences between the computed value and the fading envelope obtained by the interpolation;

integrating squares of the differences in the section between the successive pilot signals; and averaging integrals obtained by the integration in the section between the successive pilot signals.

4. The received SIR measuring method as claimed in claim 2, wherein said step of measuring the received interference wave power comprises the steps of:

computing ratios of the received data symbols to a fading envelope obtained by interpolation;

multiplying the ratios by a square of the fading envelope;

making a decision of signal points from results of the multiplication;

computing a fading envelope including interference components using the received data symbols and the decision results;

computing differences between the computed value and the fading envelope obtained by the interpolation;

integrating squares of the differences in the section between the successive pilot signals; and averaging integrals obtained by the integration in a plurality of sections between the successive pilot signals.

5. The received SIR measuring method as claimed in claim 2, wherein said step of measuring the received interference wave power comprises the steps of:

computing ratios of the received data symbols to a fading envelope obtained by interpolation;

multiplying the ratios by a square of the fading envelope;

making a decision of signal points from results of the multiplication;

computing a fading envelope including interference components using the received data symbols and the decision results;

computing an average value of the received data symbols in a pilot signal section;

computing differences between said fading envelope and said average value;

integrating squares of the differences in the section between the successive pilot signals; and averaging integrals obtained by the integration over a plurality of sections between the successive pilot signals.

6. The received SIR measuring method as claimed in claim 2, wherein said step of measuring the received interference wave power comprises the steps of:

computing ratios of the received data symbols to a fading envelope obtained by interpolation;

multiplying the ratios by a square of the fading envelope;

making a decision of signal points from results of the multiplication;

computing a fading envelope including interference components using the received data symbols and the decision results;

computing an average value of the received data symbols in a pilot signal section;

computing differences between said fading envelope and said average value;

integrating squares of the differences in only the pilot signal section; and averaging integrals obtained by the integration over a plurality of sections between the successive pilot signals.

7. The received SIR measuring method as claimed in claim 2, wherein said step of measuring the received interference wave power comprises the steps of:

computing ratios of the received data symbols to a fading envelope obtained by interpolation;

multiplying the ratios by a square of the fading envelope;

averaging products of the multiplication in the section between successive pilot signals;

computing differences between an average value obtained by the averaging and said products of the multiplication;

integrating squares of the differences in the section between the successive pilot signals; and averaging integrals obtained by the integration over a plurality of sections between the successive pilot signals.

8. A received SIR (signal-to-interference plus noise power ratio) measuring method of a communications system using a signal including a known pilot signal inserted into an information signal at predetermined intervals, said method comprising:

the step of measuring received desired wave power including the steps of:

computing ratios of received data symbols to a fading envelope obtained by interpolation, multiplying the ratios by a square of the fading envelope, averaging products of the multiplication in the section between successive pilot signals, and obtaining a square of an absolute value of an average value obtained by the averaging, wherein the square of the absolute value is adopted as the received desired wave power;

the step of measuring received interference wave power which obtains received interference wave power from the received data symbols and the fading envelope obtained by the interpolation; and the step of computing a ratio of the received desired wave power to the received interference wave power, wherein the computed ratio is adopted as the SIR.

9. The received SIR measuring method as claimed in claim 8, wherein said step of measuring the received interference wave power comprises the steps of:

making a decision of signal points from results of the multiplication;

computing a fading envelope including interference components using the received data symbols and the decision results;

computing differences between the computed value and the fading envelope obtained by the interpolation;

integrating squares of the differences in the section between the successive pilot signals; and averaging integrals obtained by the integration in a plurality of sections between the successive pilot signals.

10. The received SIR measuring method as claimed in claim 8, wherein said step of measuring the received interference wave power comprises the steps of:

making a decision of signal points from results of the multiplication;

computing a fading envelope including interference components using the received data symbols and the decision values;

computing an average value of the received data symbols in the section between successive pilot signals;

computing differences between said fading envelope and said average value;

integrating squares of the differences in the section between the successive pilot signals; and averaging integrals obtained by the integration over a plurality of sections between the successive pilot signals.

11. The received SIR measuring method as claimed in claim 8, wherein said step of measuring the received interference wave power comprises the steps of:

making a decision of signal points from results of the multiplication;

computing a fading envelope including interference components using the received data symbols and the decision results;

computing an average value of the received data symbols in a pilot signal section;

computing differences between said fading envelope and said average value;

integrating squares of the differences in only the pilot signal section; and averaging integrals obtained by the integration over a plurality of sections between the successive pilot signals.

12. The received SIR measuring method as claimed in claim 8, wherein said step of measuring the received interference wave power comprises the steps of:

averaging products of the multiplication in the section between successive pilot signals;

computing differences between an average value obtained by the averaging and said products of the multiplication;

integrating squares of the differences in the section between the successive pilot signals; and averaging integrals obtained by the integration over a plurality of sections between the successive pilot signals.

13. A received SIR measuring apparatus of a communications system using a signal including a known pilot signal inserted into an information signal at predetermined intervals, said apparatus comprising:

coherent detection means for carrying out interpolating coherent detection using the pilot signal;

means for computing power values of the information data symbols decided by interpolation;

means for obtaining an integral of the power values of the information data symbols in the predetermined interval of the pilot signal;

means for computing differences between power values of the decided information data symbols and power values of a fading envelope at same sampling times;

means for obtaining an integral of said differences of the power values in the predetermined interval of the pilot signal; and means for computing a ratio of the integral of the power values of the information data symbol to the integral of said differences of the power values, wherein the computed ratio is adopted as the signal-to-interference plus noise power ratio (SIR).

14. A received SIR measuring apparatus of a communications system using a signal including a known pilot signal inserted into an information signal at predetermined intervals, said apparatus comprising:

a received desired wave power measuring circuit including:

means for computing power values of a fading envelope obtained by interpolation, and means for averaging the power values in a section between successive pilot signals, wherein the obtained average value is adopted as the received desired wave power;

a received interference wave power measuring circuit for measuring received interference wave power from received data symbols and the fading envelope; and a computing circuit for computing a ratio of the received desired wave power to the received interference wave power, wherein the computed ratio is adopted as the SIR.

15. The received SIR measuring apparatus as claimed in claim 14, wherein said received interference wave power measuring circuit comprises:

means for computing ratios of the received data symbols to a fading envelope obtained by interpolation;

means for multiplying the ratios by a square of the fading envelope; means for making a decision of signal points from results of the multiplication;

means for computing a fading envelope including interference components using the received data symbols and the decision results;

means for computing differences between the computed value and the fading envelope obtained by the interpolation;

means for integrating squares of the differences in the section between the successive pilot signals; and means for averaging integrals obtained by the integration in the section between the successive pilot signals.

16. The received SIR measuring apparatus as claimed in claim 14, wherein said received interference wave power measuring circuit comprises:

means for computing ratios of the received data symbols to a fading envelope obtained by interpolation;

multiplying means for multiplying the ratios by a square of the fading envelope;

means for making a decision of signal points from results of the multiplication;

means for computing a fading envelope including interference components using the received data symbols and the decision results;

means for computing an average value of the received data symbols in the section between successive pilot signals;

means for computing differences between said fading envelope and said average value;

means for integrating squares of the differences in the section between the successive pilot signals; and means for averaging integrals obtained by the integration over a plurality of sections between the successive pilot signals.

17. The received SIR measuring apparatus as claimed in claim 14, wherein said received interference wave power measuring circuit comprises:

means for computing on a complex signal space ratios of the received data symbols to a fading envelope obtained by interpolation;

means for multiplying the ratios by a square of the fading envelope;

means for making a decision of signal points from results of the multiplication;

means for computing a fading envelope including interference components using the received data symbols and the decision values;

means for computing an average value of the received data symbols in a pilot signal section;

means for computing differences between said fading envelope and said average value;

means for integrating squares of the differences in only the pilot signal section; and means for averaging integrals obtained by the integration over a plurality of sections between the successive pilot signals.

18. A received SIR measuring apparatus of a communications system using a signal including a known pilot signal inserted into an information signal at predetermined intervals, said apparatus comprising:

a received desired wave power measuring circuit including,
   means for computing ratios of received data symbols to a fading envelope obtained by interpolation,
   means for multiplying the ratios by a square of the fading envelope, and
   means for averaging products of the multiplication in the section between successive pilot signals,
   wherein a square of an absolute value of the average value is adopted as received desired wave power;

a received interference wave power measuring circuit for measuring received interference wave power from the received data symbols and the fading envelope; and a computing circuit for computing a ratio of the received desired wave power to the received interference wave power, wherein the computed ratio is adopted as the SIR.

19. The received SIR measuring apparatus as claimed in claim 18, wherein said received interference wave power measuring circuit comprises:

means for averaging products of the multiplication in the section between successive pilot signals, means for computing differences between an average value obtained by the averaging and said products of the multiplication;

means for integrating squares of the differences in the section between the successive pilot signals; and means for averaging integrals obtained by the integration over a plurality of sections between the successive pilot signals.

20. The received SIR measuring apparatus as claimed in claim 18, wherein said received interference wave power measuring circuit comprises:

means for making a decision of signal points from results of the multiplication;

means for computing a fading envelope including interference components using the received data symbols and the decision values;

means for computing differences between the computed value and the fading envelope obtained by the interpolation;

means for integrating squares of the differences in the section between the successive pilot signals; and means for averaging integrals obtained by the integration in a plurality of sections between the successive pilot signals.

21. The received SIR measuring apparatus as claimed in claim 18, wherein said received interference wave power measuring circuit comprises:

means for making a decision of signal points from results of the multiplication;

means for computing a fading envelope including interference components using the received data symbols and the decision values;

means for computing an average value of the received data symbols in the section between successive pilot signals;

means for computing differences between said fading envelope and said average value;

means for integrating squares of the differences in the section between the successive pilot signals; and means for averaging integrals obtained by the integration over a plurality of sections between the successive pilot signals.

22. The received SIR measuring apparatus as claimed in claim 18, wherein said received interference wave power measuring circuit comprises:

means for making a decision of signal points from results of the multiplication;

means for computing a fading envelope including interference components using the received data symbols and the decision values;

means for computing an average value of the received data symbols in a pilot signal section;

means for computing differences between said fading envelope and said average value;

means for integrating squares of the differences in only the pilot signal section; and means for averaging integrals obtained by the integration over a plurality of sections between the successive pilot signals.

23. The received SIR measuring apparatus as claimed in claim 18, wherein said received interference wave power measuring circuit comprises:

means for averaging products of the multiplication in the section between successive pilot signals;

means for computing differences between an average value obtained by the averaging and said products of the multiplication;

means for integrating squares of the differences in the section between the successive pilot signals; and means for averaging integrals obtained by the integration over a plurality of sections between the successive pilot signals.

24. A transmission power control system comprising:

means for comparing a resultant SIR measured by the received SIR measuring apparatus as defined in any one of claims 13–23 with a target SIR;

means for transmitting a transmission power control signal to a party station in response to a compared result;

means for receiving and demodulating a transmission power control signal transmitted from the party station; and means for controlling transmission power in accordance with the demodulated transmission power control signal.

* * * * *